US010006153B2

(12) United States Patent
Muramatsu

(10) Patent No.: US 10,006,153 B2
(45) Date of Patent: Jun. 26, 2018

(54) CARBON FIBER AND METHOD FOR PRODUCING SAME

(71) Applicant: INCUBATION ALLIANCE, INC., Kobe-shi, Hyogo (JP)

(72) Inventor: Kazuo Muramatsu, Kobe (JP)

(73) Assignee: INCUBATION ALLIANCE, INC., Kobe-shi (JP)

(*) Notice: Subject to any disclaimer, the term of this patent is extended or adjusted under 35 U.S.C. 154(b) by 0 days. days.

(21) Appl. No.: 15/369,945

(22) Filed: Dec. 6, 2016

(65) Prior Publication Data

US 2017/0081788 A1    Mar. 23, 2017

Related U.S. Application Data

(62) Division of application No. 14/238,968, filed as application No. PCT/JP2013/080403 on Nov. 11, 2013, now Pat. No. 9,546,294.

(30) Foreign Application Priority Data

Apr. 19, 2013    (JP) ................................ 2013-088359

(51) Int. Cl.
     *D01F 9/21*      (2006.01)
     *C09D 11/00*      (2014.01)
     (Continued)

(52) U.S. Cl.
     CPC .............. *D01F 9/21* (2013.01); *C01B 32/184* (2017.08); *C01B 32/194* (2017.08); (Continued)

(58) Field of Classification Search
     CPC ... H01B 1/24; C09K 5/08; C09K 5/14; C09D 11/52; C01B 31/0446; C01B 31/001; (Continued)

(56) References Cited

U.S. PATENT DOCUMENTS 2,936,482 A * 5/1960 Kilian ...................... D01D 4/06
                                                         264/DIG. 26
7,824,651 B2 * 11/2010 Zhamu ................ C01B 31/0423
                                                         252/378 R
(Continued)

FOREIGN PATENT DOCUMENTS

CN         1957122 A      5/2007
CN       102414125 A      4/2012
(Continued)

OTHER PUBLICATIONS

PCT/JP2013/080403: International Preliminary Report on Patentability dated Nov. 11, 2013.
(Continued)

*Primary Examiner* — Daniel C McCracken
(74) *Attorney, Agent, or Firm* — Kratz, Quintos & Hanson, LLP

(57) ABSTRACT

The present invention relates to a method for producing a carbon fiber that can be suitably used as a transparent conductive material for forming transparent flexible conductive films and the like, more particularly, to a method for producing a carbon fiber having an outermost surface composed of edges of graphenes, and to a carbon fiber produced by the production method. The production method comprises a step of pre-baking a fiber of an organic compound so as to contain remaining hydrogen, and a step of putting the pre-baked fiber of the organic compound in a closed vessel made of a heat resistant material and subjecting the pre-baked fiber together with the vessel to hot isostatic pressing treatment using a compressed gas atmosphere, wherein a maximum ultimate temperature in the hot isostatic pressing treatment is 1000 to 2000° C.

6 Claims, 12 Drawing Sheets

(51) Int. Cl.
  C09K 5/08    (2006.01)
  H01B 1/04    (2006.01)
  H01B 1/24    (2006.01)
  D01F 9/14    (2006.01)
  D01F 9/32    (2006.01)
  C09D 1/00    (2006.01)
  C09D 5/24    (2006.01)
  C09D 11/03   (2014.01)
  C09D 11/52   (2014.01)
  C09K 5/14    (2006.01)
  H01M 4/62    (2006.01)
  C01B 32/184  (2017.01)
  C01B 32/194  (2017.01)
  C01B 32/196  (2017.01)
  B82Y 40/00   (2011.01)

(52) U.S. Cl.
  CPC .............. *C01B 32/196* (2017.08); *C09D 1/00*
    (2013.01); *C09D 5/24* (2013.01); *C09D 11/03*
    (2013.01); *C09D 11/52* (2013.01); *C09K 5/14*
    (2013.01); *D01F 9/14* (2013.01); *D01F 9/32*
    (2013.01); *H01B 1/24* (2013.01); *H01M 4/625*
    (2013.01); *B82Y 40/00* (2013.01)

(58) Field of Classification Search
  CPC ......... C01B 9/32; C01B 31/0484; D01F 9/32;
      D01F 9/14; Y10T 442/60; Y10T 442/30
  See application file for complete search history.

(56) References Cited

U.S. PATENT DOCUMENTS

| 2007/0184348 | A1 | 8/2007  | Sakurai et al.    |
| 2012/0045384 | A1 | 2/2012  | Muramatsu et al.  |
| 2012/0077020 | A1 | 3/2012  | Muramatsu et al.  |
| 2012/0315482 | A1 | 12/2012 | Muramatsu et al.  |

FOREIGN PATENT DOCUMENTS

| CN | 102448880    | A  | 5/2012  |
| CN | 102791628    | A  | 11/2012 |
| EP | 2392701      | A1 | 12/2011 |
| EP | 2537801      | A1 | 12/2012 |
| EP | 2567938      | A1 | 3/2013  |
| JP | 2012188790   | A  | 10/2012 |
| WO | 2010137592   | A2 | 12/2010 |
| WO | 2011102473   | A1 | 8/2011  |
| WO | 2012058553   | A2 | 2/2012  |

OTHER PUBLICATIONS

PCT/JP2013/080403: International Search Report dated Jan. 21, 2014.
Taiwan Application No. 102142004: Office Action dated Jan. 23, 2015.
China Application No. 201380002736.6: Office Action dated Jul. 1, 2015, partial translation.
Europe Application No. 13826710.9: Extended European Search Report dated Nov. 6, 2015.
Bae, Sukang et al., Roll-to-Roll Production of 30-inch Graphene Films for Transparent Electrodes, Nature Nanotechnology, Letters, vol. 5, Jun. 20, 2010, pp. 574-578.
Berger, Claire et al., Electronic Confinement and Coherence in Patterned Epitaxial Graphene, Science, Reports, vol. 312, May 26, 2006, pp. 1191-1196.
Blake, Peter et al., Graphene-Based Liquid Crystal Device, Nano Letters, vol. 8, No. 6, 2008, pp. 1704-1708.
Geim, A.K. et al., The Rise of Graphene, Nature Materials, Progress Article, vol. 6, Mar. 2007, pp. 183-191.
Li, Xuesong et al., Large-Area Synthesis of High-Quality and Uniform Graphene Films on Copper Foils, Science, Reports, vol. 324, Jun. 5, 2009, pp. 1312-1314.
Novoselov, K.S. et al., Electric Field Effect in Atomically Thin Carbon Films, Science, Reports, vol. 306, Oct. 22, 2004, pp. 666-669.
Ohta, Taisuke et al., Controlling the Electronic Structure of Bilayer Graphene, Science, Reports, vol. 313, Aug. 18, 2006, pp. 951-954.
Zhou, S.Y. et al., Substrate-induced Bandgap Opening in Epitaxial Graphene, Nature Materials, Articles, vol. 6, Oct. 2007, pp. 770-775.

* cited by examiner

CARBON FIBER AND METHOD FOR PRODUCING SAME

CROSS REFERENCE TO RELATED APPLICATIONS

This application is a divisional of U.S. patent application Ser. No. 14/238,968, filed Feb. 14, 2014, which is a 371 of International Application PCT/JP2013/080403, filed Nov. 11, 2013, which claims priority to Japanese Patent Application No. 2013-088359, filed Apr. 19, 2013, each of which is hereby incorporated herein by reference in its entirety.

TECHNICAL FIELD

The present invention relates to a carbon fiber suitably usable for transparent conductive materials for forming transparent flexible conductive films; high heat-release and heat-transfer materials for forming heat-release sheets for, for example, smartphone; conductive inks for printable electronics; conductive materials and semiconductor materials for forming semiconductor inks; conductive additive materials for adding to electrodes for lithium-ion batteries, lithium-ion capacitors, fuel cell batteries, other primary and secondary batteries, and the like; gas diffusion layers of fuel cell batteries; catalyst materials used for, for example, reduction of active oxygen; electrodes for, for example, field emission displays (FED) and X-ray tubes; needles of tunneling microscopes, and the like, and more particularly, to a carbon fiber comprising graphenes, and to a method for producing the same.

BACKGROUND ART

Conventional methods for producing carbon materials comprising graphenes include various methods such as tape removal method (non-patent documents 1 and 2), solvent extraction method (non-patent document 3), substrate method (non-patent documents 4 and 5), and sublimation method (non-patent documents 6, 7, and 8).

(Tape Peeling Method)

Thin sheet graphite is extracted by applying an adhesive tape to graphite and peeling the tape. When the tape is removed, only thin sheet graphite adheres to a surface of the tape. The graphite adhered to the surface of the tape has at least several dozen layers, is in black ash color, and does not transmit light. By pressing the thin sheet graphite adhered to the adhesive surface of the adhesive tape onto a surface of a silicon wafer with a thermally-oxidized film of an appropriate thickness and then removing the tape, a small fraction of the thin sheet graphite is transferred to the surface of the thermally-oxidized film as graphenes having various numbers of layers. Since relatively large graphenes with good crystallinity can be obtained by this method, the method is suitable for preparing a sample to analyze crystal structures, electronic natures, and the like of graphene. However, productivity is significantly low as a method for producing graphenes industrially.

(Solvent Extraction Method)

Graphite materials such as natural graphite and artificial graphite are basically polycrystalline materials, and in the structures thereof, graphite structures with various numbers of layers exist in connection with many material defects. The solvent extraction method is to extract graphenes in the materials through applying an ultrasonic wave in an organic solvent. Depending on the crystallinity of a graphite material used, various forms of graphene-like thin sheets can be obtained. Most of them are detached or separated thin sheet crystallites. Those in micron order in shape mostly have 20 or more layers, while those having several layers are in submicron order. Therefore, it is less likely to extract a large graphene with a small number of layers.

(Substrate Method)

Substrate method is similar to a method for producing a carbon nanotube, and uses a eutectic reaction in which carbons are made solid-soluble and precipitated in metal by employing a transition metal as a catalyst in a thermal CVD reaction. By subjecting a substrate made of Ni, Fe, or the like to a thermal CVD reaction at around 1000° C., graphenes can be precipitated on a surface of the substrate. At the beginning of development of substrate method, substrates made of Ni were mainly used, but currently substrates made of Cu, which can adsorb carbons onto the surface almost without dissolving carbons thereinto, are often used for the synthesis. After formation of graphene film on a surface of a Cu foil by a substrate method, an acrylic resin is coated thereon and cured to fix graphenes on the back surface of the acrylic resin. Then the Cu foil is dissolved completely in acid to form an acrylic resin film with many graphene fragments fixed thereto. To transfer the graphenes to various base materials such as PET film, the base material is laminated onto the graphenes fixed to the acrylic resin film, a laminated product of acrylic resin film/graphenes/base material is formed by heating and pressing by hot pressing, and then the acrylic resin is removed by acetone or the like. By this method, base materials in which a single-layer and multi-layer graphenes have been transferred can be produced relatively easily on experimental level, but the method is a complicated industrial method because metal as a base material should be dissolved completely to extract synthesized graphenes.

(Sublimation Method)

By heating a single-crystal SiC wafer to around 1600° C., Si atoms are sublimed selectively from a surface of the wafer and C atoms are rearranged to form a graphene layer. Since graphenes can be directly formed on a surface of an insulating substrate, and band gap formation can be achieved by controlling the number of layers and doping, this method is considered to be used as a graphene formation technology in device architecture such as sensors and high-speed switching devices. On the other hand, it is difficult to separate graphenes formed, and thus the method is not suitable for producing a graphene material itself.

However, to put the obtained graphenes into practical use taking advantage of functions of graphenes, it is required to combine graphenes with various materials as needed while preventing aggregation, stack, and adhesion of graphenes, because graphenes have the properties of aggregating, stacking, and adhering to each other or in itself easily due to Van der Waals force. If graphenes are stably stacked in multiple layers, graphite is formed, and advantageous functions of the graphenes are lost.

Therefore, to promote practical use of graphenes, it is required to meet the following requirements in producing carbon materials comprising graphenes: 1) synthesizing self-organized graphenes via space in a three-dimensional structure; 2) preventing aggregation, stack, and adhesion of graphenes each other or in itself as much as possible and putting graphenes in a separated state; 3) combining with various materials while maintaining the structure of graphene, but at present, there remains a variety of problems.

The edge and surface of graphene have characteristic functions that other carbon materials cannot exhibit, for example, a catalytic function to accelerate a chemical reaction in a fuel cell battery reaction, and a catalytic function to reduce active oxygen. To make effective use of such edge or surface of graphene, it is necessary to fix three-dimensionally many very thin graphenes in nanometer order in a space and fulfill the functions sufficiently.

CITATION LIST

Non-Patent Literature

Non-patent Document 1: 2) K. S. Novoselov, A. K. Geim, S. V. Morozov, D. Jiang, Y. Zhang, S. V. Dubons, I. V. Grigorieva and A. A. Firsov, Science, 306(2004)666
Non-patent Document 2: A. K. Geim and K. S. Novoselov, Nature Mater. 6(2007)183
Non-patent Document 3: P. Blake et al., Nano Lett., 8(2008) 1704
Non-patent Document 4: X. Li et al., Science, 324(2009) 1312
Non-patent Document 5: S. Bae et al., Nature Nanotech, 5(2010)574
Non-patent Document 6: C. Berger et al., Science, 312, 19912(2006)
Non-patent Document 7: S. Y. Zhou et al., Nature mat. 6, 916(2007)
Non-patent Document 8: T. Ohta et al., Science 313, 951 (2006)

SUMMARY OF INVENTION

Technical Problem

The present invention provides a carbon fiber having a novel structure in which very thin graphenes are fixed three-dimensionally in a space and a method for producing the same.

Solution to Problem

The inventors of the present invention have made intensive study and as a result, have found that the above problems can be solved by pre-baking a fiber of an organic compound so as to contain remaining hydrogen and then subjecting the pre-baked fiber to hot isostatic pressing treatment (HIP treatment) under predetermined conditions, and have conducted further studies to complete the present invention.

Namely, the present invention relates to a method for producing a carbon fiber having an outermost surface composed of edges of graphenes. The production method comprises steps of pre-baking a fiber of an organic compound so as to contain remaining hydrogen, putting the pre-baked fiber of an organic compound in a closed vessel made of a heat resistant material and subjecting the pre-baked fiber together with the vessel to hot isostatic pressing treatment using a compressed gas atmosphere, wherein a maximum ultimate temperature in the hot isostatic pressing treatment is 1000 to 2000° C.

In the above production method, the remaining hydrogen is preferably 500 ppm or more.

In the above production method, a pre-baking temperature is preferably 1000° C. or lower.

In the above production method, the fiber of an organic compound is preferably in the form of yarn, woven fabric, non-woven fabric, blended yarn with other fiber, or woven fabric or non-woven fabric made of the blended yarn.

In the above production method, a mean diameter of the fiber of an organic compound before the pre-baking is preferably 500 μm or less.

In the above production method, the closed vessel made of a heat resistant material is preferably a graphite closed vessel.

In the above production method, the graphite closed vessel preferably has an open pore ratio of less than 20% and is of triangular screw type.

In the above production method, the organic compound is preferably one or more selected from the group consisting of starch, cellulose, protein, collagen, alginic acid, dammar, kovar, rosin, gutta-percha, natural rubber, cellulose resin, cellulose acetate, cellulose nitrate, cellulose acetate butyrate, casein plastic, soybean protein plastic, phenol resin, urea resin, melamine resin, benzoguanamine resin, epoxy resin, diallyl phthalate resin, unsaturated polyester resin, a bisphenol A type epoxy resin, Novolac type epoxy resin, polyfunctional epoxy resin, alicyclic epoxy resin, alkyd resin, urethane resin, polyester resin, vinyl chloride resin, polyethylene, polypropylene, polystyrene, polyisoprene, butadiene, nylon, vinylon, acrylic fiber, rayon, polyvinyl acetate, ABS resin, AS resin, acrylic resin, polyacetal, polyimide, polycarbonate, modified polyphenylene ether, polyarylate, polysulfone, polyphenylene sulfide, polyether ether ketone, fluorine-contained resin, polyamide imide, silicon resin, petroleum pitch, coal pitch, petroleum coke, coal coke, carbon black, activated carbon, waste plastic, waste PET bottle, waste wood, waste plants, and garbage.

In the above production method, the hot isostatic pressing treatment is preferably carried out in such a state that a part or the whole around the pre-baked fiber of an organic compound charged in the closed vessel made of graphite is covered with a spacer and a sleeve.

In the above production method, the spacer and the sleeve is preferably made of one or more selected from the group consisting of glassy carbon, diamond-like carbon, and amorphous carbon.

The present invention further relates to a carbon fiber having an outermost surface composed of edges of graphenes in the form of yarn, woven fabric, or non-woven fabric.

The present invention further relates to a method for producing a graphene dispersion comprising graphenes and a solvent, comprising:
soaking the carbon fiber having an outermost surface composed of edges of graphenes prepared by the production method of claim 1 in the solvent,
subjecting the mixture to ultrasonic wave treatment, and then filtering the mixture.

In the above production method, an aspect ratio of the carbon fiber is preferably 2.5 or more.

In the above production method, a mean diameter of the carbon fiber is preferably within a range from 0.1 to 500 μm.

In the above production method, the solvent preferably further comprises a dispersant.

Advantageous Effects of Invention

According to the production method of the present invention, a carbon fiber having an outermost surface composed of edges of graphenes can be produced by HIP treatment being a simple treatment method using chemical vapor deposition (CVD) reaction, and such a carbon fiber can be produced easily at low-cost, as well as in a short period of time and in large amounts.

The thus obtained carbon fiber of the present invention has edges of graphenes at the outermost surface, which means broad surface areas of graphenes formed by three dimensional network structure of graphenes exist inside the fiber. Therefore, the carbon fiber of the present invention enables the edges and surface areas of the graphenes to be contacted with various gases and liquids efficiently. Accordingly, the carbon fiber of the present invention can be suitably used for transparent conductive materials for forming transparent flexible conductive films; high heat-release and heat-transfer materials for forming heat-release sheets for, for example, smartphone; conductive inks for printable electronics; conductive materials and semiconductor materials for forming semiconductor inks; conductive additive materials for adding to electrodes for lithium-ion batteries, lithium-ion capacitors, fuel cell batteries, other primary and secondary batteries, and the like; gas diffusion layers of fuel cell batteries; catalyst materials used for, for example, reduction of active oxygen; electrodes for, for example, Field Emission Displays and X-ray tubes; needles of tunneling microscopes, and the like.

In the production method of the present invention, by using fibers of an organic compound in the form of woven fabric or non-woven fabric as a starting material, a woven fabric or non-woven fabric comprising carbon fibers having an outermost surface structure composed of edges of graphenes can be produced. As it can, if necessary, be put into a large-sized, a sheet-like, or a curved form or into a variety of forms for, for example, lining an inner surface of a vessel, covering a cylindrical part, using it as mat consisting of multilayered lamination, or using it in a roll shape by rolling, it can be fixed to and filled at various sites. Accordingly, graphenes, which are expected to be put into practical use for various applications, can be provided as an ideal material suitable for multiple applications. Furthermore, in producing carbon fibers of the present invention, by blending fibers of an organic compound being starting material with other fibers (for example, carbon fiber) to obtain blended yarns and making the blended yarns into a woven fabric or non-woven fabric beforehand, a woven fabric or non-woven fabric being a composite material with other yarns can be produced.

Furthermore, advantageously, a graphene dispersion in which graphenes are dispersed in a solvent can be obtained easily by using the carbon fiber of the present invention.

DESCRIPTION OF EMBODIMENTS

Figure 1:
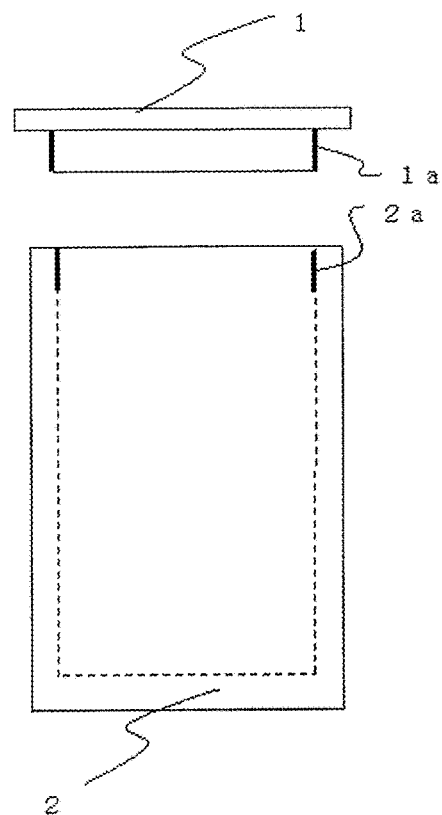
FIG. 1 A cross-sectional view showing a structure of a graphite crucible according to an embodiment of the present invention.

The method for producing a carbon fiber having an outermost surface composed of edges of graphenes of the present invention, that is, steps of pre-baking a fiber of an organic compound so as to contain a predetermined amount of remaining hydrogen, putting the pre-baked fiber of an organic compound in a closed vessel made of a heat resistant material and subjecting the pre-baked fiber together with the vessel to hot isostatic pressing treatment using a compressed gas atmosphere will be described below.

(Fibers of Organic Compound)

Examples of usable organic compound are those mentioned below. There can be used, for example, natural organic polymers such as starch, cellulose, protein, collagen, alginic acid, dammar, kovar, rosin, gutta-percha, and natural rubber; semisynthetic polymers such as cellulose resin, cellulose acetate, cellulose nitrate, cellulose acetate butyrate, casein plastic, and soybean protein plastic; and synthetic polymers such as thermosetting reins such as phenol resin, urea resin, melamine resin, benzoguanamine resin, epoxy resin, diallyl phthalate resin, unsaturated polyester resin, bisphenol A type epoxy resin, Novolac type epoxy resin, polyfunctional epoxy resin, alicyclic epoxy resin, alkyd resin, and urethane resin; thermoplastic resins such as polyester resins (polyethylene terephthalate (PET) resin, polytrimethylene terephthalate resin, polybutylene terephthalate resin, polyethylene naphthalate resin, polybutylene naphthalate resin, and the like), vinyl chloride resin, polyethylene, polypropylene, and polystyrene; synthetic rubbers such as polyisoprene and butadiene; synthetic fibers such as nylon, vinylon, acrylic fiber, and rayon, and other materials such as polyvinyl acetate, ABS resin, AS resin, acrylic resin, polyacetal, polyimide, polycarbonate, modified polyphenylene ether (PPE), polyarylate, polysulfone, polyphenylene sulfide, polyether ether ketone, fluorine-contained resin, polyamide imide, and silicon resin.

It is a matter of course that petroleum pitch, coal pitch, petroleum coke, coal coke, carbon black, and active carbon which are generated when refining fossil fuels such as petroleum and coal can be used as a starting material. In addition, toward the establishment of resources-recycling society, introduction of carbonization system has been advanced in various fields from the viewpoint of effective utilization of carbon in wastes, and waste plastics and waste PET bottles which are mixtures of the above-mentioned various resins, waste wood, waste plants, and food wastes such as garbage can also be used as the organic compound being the starting material.

In the present invention, the above organic compounds can be used alone or in combination of two or more thereof.

An organic compound used in the present invention is one in the form of fiber. Here, "fiber" refers to one in the form of long and fine yarn. The length of the fiber is not particularly limited, and for example, may be about 1 μm, or about 1 km. As for the fiber diameter, the mean fiber diameter is preferably 0.1 μm or more, more preferably 1 μm or more. If the mean fiber diameter is less than 0.1 μm, the strength for maintaining the form of fiber is insufficient and the fiber tends to be pulverized to fine powder easily. On the other hand, the mean fiber diameter is preferably 500 μm or less, more preferably 200 μm or less, further preferably 100 μm or less. If the mean fiber diameter is over 500 μm, the fiber tends to have an increased stiffness and lack flexibility as a fiber.

For the organic compound in the form of fiber used in the present invention, the aspect ratio is preferably 2.5 or more, more preferably 3.0 or more. The reason why the organic compound used as a starting material has such an aspect ratio is such that as explained infra, when a graphene dispersion is prepared from the carbon fiber of the present invention, a high-purity graphene dispersion tends to be obtained easily only by soaking the carbon fiber of the present invention in a solvent, carrying out ultrasonic wave treatment and filteration, without pulverization of the carbon fiber or centrifugation for separating the graphene dispersion. On the other hand, the upper limit of the aspect ratio is not particularly limited, and, for example, can be about 10000000.

The fiber of the organic compound used in the present invention may be in the form of yarn (for example, long fiber, short fiber, twisted yarn, hollow yarn), and the yarn can also be converted to various forms, specifically, for example, woven fabrics (for example, plain-woven fabric, satin fabric, twill fabric) or non-woven fabrics. Furthermore, the fiber of the organic compound used in the present invention may be in the form of blended yarn with other fiber (for example, carbon fiber), and the blended yarn may also be converted towoven fabric (for example, plain-woven fabric, satin fabric, twill fabric) or non-woven fabric.

(Pre-Baking)

In the present invention, pre-baking is a step of heating and baking fibers of an organic compound being a starting material and adjusting the amount of remaining hydrogen contained therein within a predetermined range. The pre-baking is carried out at a specified pre-baking temperature in an inert atmosphere, such as mainly in a nitrogen gas stream. For the pre-baking, an electric heating or gas heating type externally heating batch oven, continuous multi-tubular oven, internal heating rotary kiln, rocking kiln, or the like is used.

A pre-baking temperature is about 1000° C. or lower, preferably about 950° C. or lower, more preferably about 850° C. or lower, further preferably about 800° C. or lower, particularly preferably about 700° C. or lower. If the pre-baking temperature is over about 1000° C., gases such as hydrogen, hydrocarbon, carbon monoxide, and water required for CVD reaction tend not to be generated sufficiently in the HIP treatment. Meanwhile, the lower limit of the pre-baking temperature is about 300° C., preferably about 400° C. If the lower limit is less than about 300° C., oxygen, nitrogen, and hydrogen atoms contained in an organic compound do not become thermodynamically unstable and are not released enough to a certain extent, whereby a certain degree of polymerization and carbonization of the organic compound which is necessary as a pre-baked starting material tends not to proceed.

The amount of the remaining hydrogen is a value correlating with the pre-baking temperature, that is, as the pre-baking temperature increases, the amount of the remaining hydrogen tends to decrease. From the viewpoint of production of the target product of the present invention, it is necessary that the amount of the remaining hydrogen is enough to generate sufficient amounts of gases such as hydrogen, hydrocarbon, carbon monoxide, and water necessary for the CVD reaction at the time of HIP treatment. The amount of hydrogen is usually about 500 ppm or more, preferably about 1000 ppm or more, more preferably about 5000 ppm or more, further preferably about 6500 ppm or more, particularly preferably about 10000 ppm or more, still more particularly preferably about 20000 ppm or more.

(Closed Vessel)

The closed vessel (for example, graphite crucible) made of a heat-resistant material relating to the present invention functions as a reaction vessel for causing the CVD reaction with gases such as hydrogen, hydrocarbon, carbon monoxide, and water generated from the pre-baked starting material during the HIP treatment. It is necessary to properly select material of the vessel and closing structure thereof for causing a chemical reaction without scattering the generated reaction gas outside the vessel while keeping isotropic high pressure by a gas pressure. If the material is too dense, a difference in pressure between the inside and the outside of the vessel (for example, crucible) arises, which results in an explosive breakdown of the vessel. On the other hand, if the material is too porous, the reaction gas generated inside the vessel is easily scattered outside the vessel and efficiency of the chemical reaction is lowered.

The material and structure of the vessel (for example, crucible) are also properly selected in consideration of necessity of taking a HIP-treated product out of the vessel and closing the vessel (for example, crucible) as easily as possible in view of facilitating charging of the starting material before the HIP treatment, exposure to high temperature of about 1000° C. or more during the HIP treatment, and necessity of maintaining strength of the vessel at high temperature so as to be capable of withstanding the inside pressure caused by generation of the reaction gas from the pre-baked starting material.

Examples of the heat resistant materials constituting the reaction vessel are graphite and in addition, ceramics such as alumina, magnesia, and zirconia, and metals such as iron, nickel, zirconium, and platinum. Graphite material is suitable as a material for the vessel (for example, crucible). The graphite vessel can specifically be made of artificial graphite materials prepared by extrusion molding, CIP molding, squeeze molding, vibration molding, or rammer molding, hard carbon materials including glassy carbon prepared mainly by thermosetting resin molding, carbon fiber-reinforced carbon materials, or composite materials thereof.

The porosity of the graphite material is important for efficiently causing the chemical reaction in the vessel (for example, crucible), and therefore, a material having an open pore ratio of less than 20% can be used suitably. In the case of a material having an open pore ratio of 20% or more, the reaction gases are diffused outside the vessel (for example, crucible), and therefore, a concentration of the gases necessary for generating the graphite cannot be kept. However, in the case where there is not so large difference between the volume of the vessel (for example, crucible) and the volume of a HIP-treating chamber where the vessel is charged, an amount of gases scattering outside the vessel (for example, crucible) is not so large even if an open pore ratio of the vessel (for example, crucible) is 20% or more, and therefore, efficiency is not affected so much.

Figure 2:
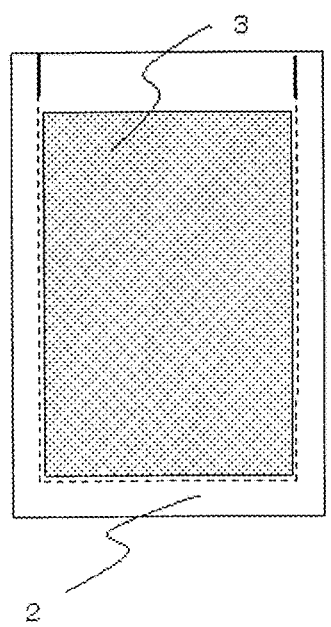
FIG. 2 A cross-sectional view showing a structure of a graphite crucible according to an embodiment of the present invention with a pre-baked starting material being charged therein.
Figure 3:
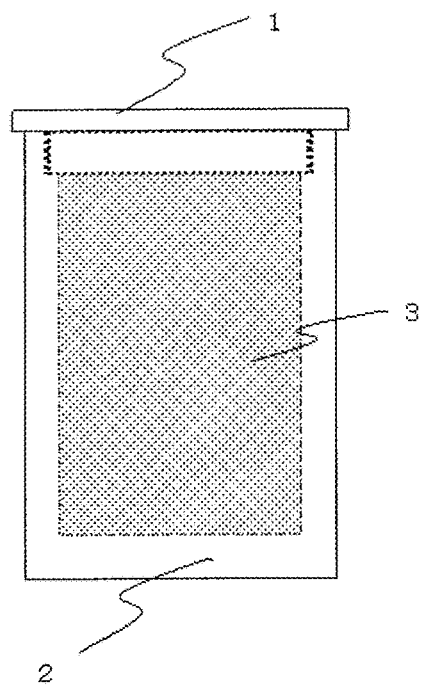
FIG. 3 A cross-sectional view showing a structure of a graphite crucible according to an embodiment of the present invention with a pre-baked starting material being charged therein and the crucible being closed.

With respect to the vessel to be used in the present invention, a screw-capped graphite crucible can be used so that charging of the pre-baked starting material in the vessel and discharging of the product after the HIP treatment can be carried out efficiently. (FIGS. 1 to 3) The inner wall 2a at the top of the crucible body 2 and the outer periphery 1a of the crucible cap 1 have thread-cutting by specified tap processing, and thereby the crucible can be closed by turning the cap 1 to the thread after charging of the pre-baked starting material 3.

Figure 4:
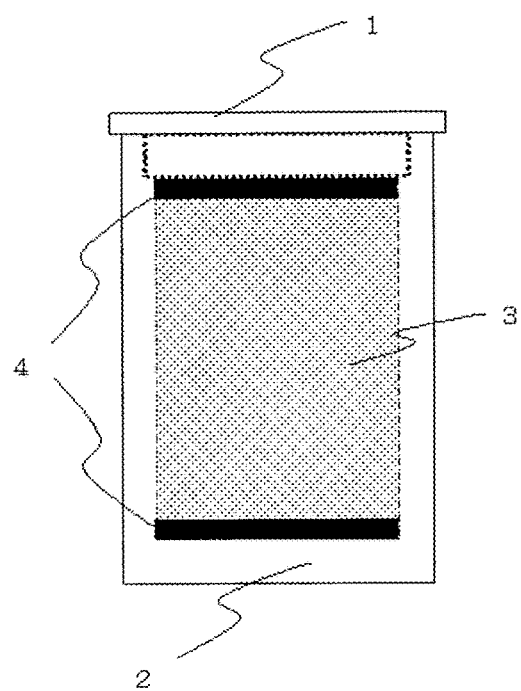
FIG. 4 A cross-sectional view showing a structure of a graphite crucible according to an embodiment of the present invention, in which the whole of the top and bottom of the pre-baked starting material 3 are covered with spacers and the crucible is closed.
Figure 5:
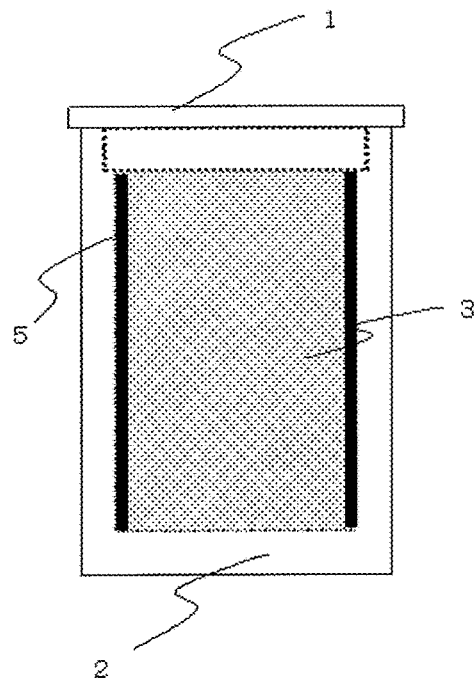
FIG. 5 A cross-sectional view showing a structure of a graphite crucible according to an embodiment of the present invention, in which the whole of the side of the pre-baked starting material 3 is covered with a sleeve and the crucible is closed.
Figure 6:
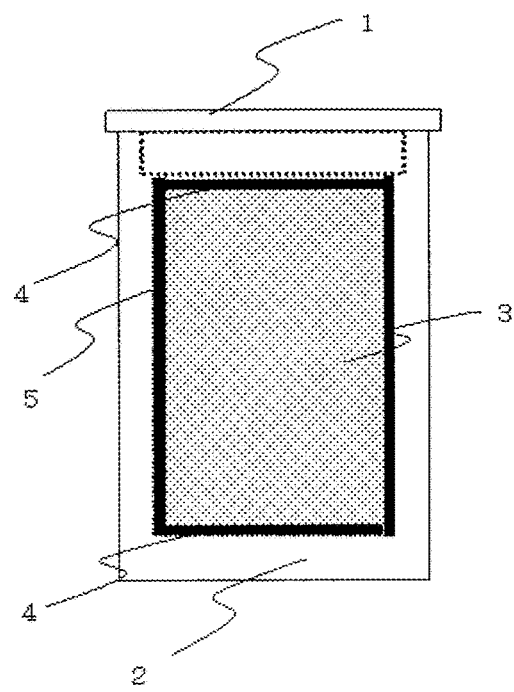
FIG. 6 A cross-sectional view showing a structure of a graphite crucible according to an embodiment of the present invention, in which the whole of the bottom, top and side of the pre-baked starting material 3 are covered with spacers and a sleeve and the crucible is closed.

By carrying out hot isostatic pressing treatment by covering the whole (or a part) of the bottom and the top of the pre-baked starting material 3 with spacers 4 made of a hard carbon material having a low open pore ratio in order to increase a degree of closing of the pre-baked starting material, extent of scattering of the reaction gases generated from the pre-baked starting material 3 from the top and the bottom of the crucible can be controlled. (FIG. 4) Further, a reaction efficiency can be increased by carrying out hot isostatic pressing treatment by covering the whole (or a part) of the side of the pre-baked starting material 3 with a sleeve 5 made of a hard carbon material having a low open pore ratio (FIG. 5) or by covering the whole (or a part) around the pre-baked starting material 3 with spacers 4 and a sleeve 5 (FIG. 6). Examples of the carbon material for the spacer and the sleeve are glassy carbon, diamond-like carbon, amorphous carbon and the like, and one of them can be used alone, or two or more thereof can be used together. The open pore ratio of the carbon material is usually less than 0.5%. Even if the pre-baked starting material is covered with spacers and a sleeve having an open pore ratio of 0%, there is a gap between the spacers and the sleeve. Therefore, the pre-baked starting material cannot be closed completely with the spacers and the sleeve.

Examples of the screw of the screw-capped graphite crucible are a triangular screw (having a cross-section of screw thread in the form like equilateral triangle), a square screw, a trapezoid screw, and the like, and among these, a triangular screw is preferred.

(HIP Treatment)

The thus obtained pre-baked starting material (fiber of an organic compound) containing remaining hydrogen is subjected to HIP treatment under predetermined conditions. The maximum ultimate temperature at the HIP treatment is from about 1000° C. to about 2000° C., preferably from about 1200° C. to about 1900° C., more preferably from about 1400° C. to about 1800° C. If the maximum ultimate temperature is less than about 1000° C., there is a tendency that thermal excitation of gases generated from the pre-baked starting material is difficult to occur and CVD reaction is difficult to proceed. On the other hand, if the maximum ultimate temperature is over about 2000° C., the target product tends to be damaged by etching with the exciting hydrogen. The maximum ultimate temperature at the HIP treatment is higher than the pre-baking temperature, and is preferably higher by 400° C. or more.

The temperature elevating rate at the HIP treatment is from about 100° C./h to about 1000° C./h, preferably from about 300° C./h to about 800° C./h. If the temperature elevating rate is less than about 100° C./h, the reaction gases such as hydrogen generated from the pre-baked starting material are diffused into treatment media such as argon gas, and CVD reaction tends not to occur sufficiently. Meanwhile, if the temperature elevating rate is over about 1000° C./h, the heater capacity of treatment equipment needs to be increased considerably, and thus, the equipment cost tends to increase significantly.

The maximum ultimate pressure at the HIP treatment varies with a mean fiber diameter of the pre-baked starting material, and is usually within the range from about 1 MPa to about 300 MPa, preferably from about 10 MPa to about 200 MPa, more preferably from about 30 MPa to about 200 MPa. For example, in the case of a large mean fiber diameter, a higher pressure is required as the maximum ultimate pressure, and in the case of a small mean fiber diameter, a lower pressure suffices. When the mean fiber diameter is about 10 µm or more, the maximum ultimate pressure is preferably 40 MPa or more, and when the mean fiber diameter is about 5 µm or less, the HIP treatment can be suitably carried out at the maximum ultimate pressure of about 20 MPa.

In the HIP treatment, except the case that the mean fiber diameter of the pre-baked starting material is as small as about 1 µm or less, it is usually desirable from the viewpoint of production efficiency that the pressure is first elevated to a specified pressure before the temperature reaches the approximate pre-baking temperature (pressure-preceding pattern), so that the reaction gases generated from the pre-baked starting material are not diffused too much, and then, the temperature is elevated to the approximate pre-baking temperature, and thereafter, the temperature and pressure are elevated to the maximum ultimate temperature and the maximum ultimate pressure, as needed. Example of the above specified pressure is about 40 MPa. In the case of the mean fiber diameter of the pre-baked starting material being as small as about 1 µm or less, the pressure-preceding pattern as mentioned above is not necessary particularly, and HIP treatment can be carried out efficiently.

(Carbon Fiber)

Through the above steps, a carbon fiber having an outermost surface composed of edges of graphenes according to the present invention can be obtained. Form of the carbon fiber to be obtained varies depending on form of a fiber of an organic compound used as the starting material. Size of the carbon fiber is shrunk slightly through the HIP treatment.

Figure 7:
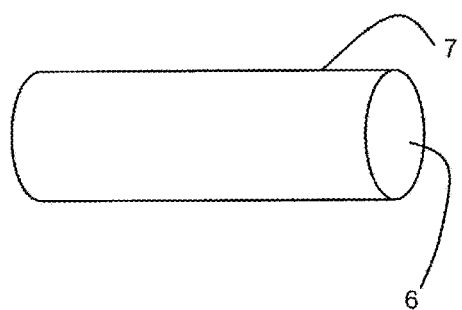
FIG. 7 A perspective view showing the outermost surface of a carbon fiber.

For example, with the use of a fiber of an organic compound in the form of yarn, a carbon fiber in the form of yarn can be obtained, and with the use of a fiber of an organic compound in the form of woven fabric or non-woven fabric, a carbon fiber in the form of woven fabric or non-woven fabric can be obtained. When a fiber of an organic compound is in the form of blended yarn with other fiber (for example, carbon fiber), and further when a fiber of an organic compound is in the form of woven fabric or non-woven fabric made of the blended yarn, the corresponding carbon fiber in the form of yarn, woven fabric, or non-woven fabric, respectively (that is, the carbon fiber of the present invention as a composite material with other fiber in the form of yarn, woven fabric or non-woven fabric) can be obtained. In the present invention, the outermost surface of the carbon fiber refers to a surface being in parallel with the fiber axis of the carbon fiber and recognized as the outermost part of the fiber (FIG. 7).

(Graphene Dispersion)

A graphene dispersion can be prepared easily with a carbon fiber of the present invention. Namely, with the carbon fiber of the present invention, particularly a carbon fiber having an aspect ratio of a predetermined value or more according to the present invention, a high-purity graphene dispersion can be obtained easily only by soaking the carbon fiber of the present invention into a solvent, carrying out ultrasonic wave treatment, and filteration, without pulverization of the carbon fiber or centrifugation for separating the graphene dispersion. Here, the graphene dispersion refers to one wherein many graphene fragments are dispersed in a solvent.

For the carbon fiber of the present invention suitably usable in a graphene dispersion, as described above, the aspect ratio thereof is preferably 2.5 or more, more preferably 3.0 or more. If the aspect ratio is less than 2.5, the purity of the graphene dispersion obtained by filtration tends to be lowered. Meanwhile, the upper limit of the aspect ratio is not particularly limited, and, for example, may be about 10000000.

In preparing a graphene dispersion from the carbon fiber of the present invention, since a pressurized medium gas is attached to the surface of the carbon fiber of the invention, the pressurized medium gas may be removed by subjecting the carbon fiber to heat treatment in advance (for example, at a temperature of 100° C. or more) or the crystallinity of the graphene may be increased, if necessary, and then, the subsequent steps may follow.

The carbon fiber of the present invention may be soaked into a solvent by a conventional method, for example, by putting the carbon fiber into a solvent and allowing the solvent to stand. At this time, the solvent may be stirred to such an extent not to pulverize the carbon fiber.

Examples of the solvent are 1,2-dichloroethane, benzene, thionyl chloride, acetyl chloride, tetrachloroethylene carbonate, dichloroethylene carbonate, benzoyl fluoride, benzoyl chloride, nitromethane, nitrobenzene, acetic anhydride, phosphorus oxychloride, benzonitrile, selenium oxychloride, acetonitrile, tetramethylsulfone, dioxane, 1,2-propanediol carbonate, benzyl cyanide, ethylene sulfite, isobutyronitrile, propionitrile, a carbonic acid ester such as dimethyl carbonate, propylene carbonate, ethyl methyl carbonate, diethyl carbonate, and ethylene carbonate; phenyl phosphoric acid difluoride, methyl acetate, n-butyronitrile, acetone, ethyl acetate, water, phenyl phosphoric acid dichloride, diethyl ether, tetrahydrofuran, diphenyl phosphoric acid chloride, trimethyl phosphate, tributyl phosphate, dimethylformamide, N-methylpyrrolidine, n-dimethylacetamide, dimethyl sulfoxide, N-diethylformamide, N-diethylacetamide, pyridine, hexamethylphosphoric amide, hexane, carbon tetrachloride, diglyme, trichloromethane, 2-propanol, methanol, ethanol, propanol, and a polyalcohol such as ethylene glycol; methyl ethyl ketone, 2-methoxyethanol, dimethylacetamide, toluene, and polybenzimidazole. These solvents can be used alone or in a mixture of two or more thereof.

In addition, a dispersant can be added to these solvents in order to increase an amount of graphenes to be dispersed or to prevent agglomeration of the graphenes in a solvent. Examples of a dispersant are surfactants and, in addition, those having a weak binding force to graphene and an electric attracting force such as a Coulomb's force and having a hydrophilic functional group such as hydroxyl and carboxyl in a structure thereof. Examples of the latter dispersants are monomers such as phenols such as phenol and a naphthol having hydroxyl bonded to benzene nucleus and polymers thereof, monomers such as styrene, propylene, acrylonitrile and vinyl acetate having carbon double bond and polymers thereof, proteins such as collagen, keratin, actin, myosin, casein, albumin, GFP and RFP, amino acids such as glycine, tyrosine, threonine and glutamine, and the like.

Examples of suitably usable surfactants are: anion based surfactants (anionic surfactants) such as fatty acid salts (for example, sodium dodecanoate), cholic acid salts (for example, sodium cholate), monoalkyl sulfates (for example, sodium lauryl sulfate), alkyl polyoxyethylene sulfate, alkyl benzene sulfonates (for example, sodium dodecyl benzene sulfonate), and monoalkyl phosphate; cation based surfactants (cationic surfactants) such as alkyl trimethyl ammonium salts (for example, cetyl trimethyl ammonium bromide), dialkyl dimethyl ammonium salts (for example, didecyl dimethyl ammonium chloride), and alkyl benzyl dimethyl ammonium salts (for example, alkyl benzyl dimethyl ammonium chloride); amphoteric surfactants (Gemini surfactants) such as alkyl dimethyl amine oxide and alkyl carboxybetaine; and non-ionic surfactants (nonionic surfactants) such as polyoxyethylene alkyl ether (for example, polyoxyethylene dodecyl ether), fatty acid sorbitan ester, alkyl polyglucoside, fatty acid diethanol amide, and alkyl monoglyceryl ether. Among these, monoalkyl sulfates are more preferable.

Among the above-mentioned solvents, preferred are dimethylformamide, water to which a dispersant (preferably a surfactant) is added, 2-methoxyethanol, 2-propanol, and the like.

An amount of a dispersant is within a range from 0.001 to 10% by weight, preferably from 0.02 to 5% by weight based on the weight of a solvent, but it is not always limited to these ranges if a film such as a transparent conductive film or a conductive film that is formed is to be washed up.

An amount of carbon fibers of the present invention is within a range from 0.001 to 50% by weight, preferably from 0.01 to 10% by weight based on the weight of a solvent.

A means for applying an ultrasonic wave is not particularly limited, and application of an ultrasonic wave can be carried out by using, for example, an ultrasonic cleaner. For example, a frequency of an ultrasonic wave to be applied is within a range from 20 to 120 kHz, preferably from 20 to 40 kHz. Time required for applying an ultrasonic wave is from about 1 to about 1200 minutes, preferably from about 20 to about 600 minutes. A means for filtration is also not particularly limited, and the filtration can be carried out by using, for example, a stainless-steel mesh. The sieve openings of the mesh may be suitably selected according to the size of carbon fibers to be filtered. For example, if a stainless-steel mesh is used, the sieve openings is preferably 1 to 3000 µm, more preferably 5 to 100 µm.

The thus obtained graphene dispersion can be used, for example, as an ink to be used for forming a circuit and a thin film for printable electronic products. In other words, a circuit and the like can be formed by printing the dispersion on a surface of a substrate by various printing methods such as flexographic printing (letterpress printing), offset printing (planographic printing), gravure printing (intaglio printing), screen printing, ink jet printing, electrophotography, heat transfer, and laser transfer. Moreover, a desired circuit can be obtained by applying the dispersion on a substrate by wet coating such as spin coating, slit coating, bar coating, blade coating or spray coating and then carrying out patterning on the coated substrate by using a patterning technique such as nano-micro contact printing, dip-pen lithography, nano-micro transfer, nanoimprinting, electron beam lithography, or photolithography.

Moreover, various high functional films such as a transparent conductive film, a highly conductive film, and a high thermal conduction film containing the graphenes can be obtained by dispersing or mixing the graphene dispersion obtained above in a starting resin such as a PET film, an ionomer film (IO film), a polyethylene film made of high density polyethylene (HDPE), medium-density polyethylene (MDPE), low-density polyethylene (LDPE), linear low-density polyethylene (L-LDPE), or metallocene catalyst type linear low-density polyethylene (mL-LDPE), hard, semi-hard or soft polyvinyl chloride film (PVC film), polyvinylidene chloride film (PVDC film), polyvinyl alcohol film (PVA film), polypropylene film (PP film), polyester film, polycarbonate film (PC film), polystyrene film (PS film), polyacrylonitrile film (PAN film), ethylene-vinyl alcohol copolymer film (EVOH film), ethylene-methacrylic acid copolymer film (EMAA film), nylon film (NY film), polyamide (PA) film), cellophane, or polyimide film. Or, various high functional films such as a transparent conductive film, a highly conductive film, and a high thermal conduction film coated with the graphenes can be obtained by coating and drying the graphene dispersion on the above-mentioned films.

Moreover, resin composite materials such as molded resin articles and fiber-reinforced plastics (FRP) containing the graphenes and having improved electric conductivity, thermal conductivity, heat resistance, strength, fracture toughness and flexibility can be obtained by dispersing or mixing the obtained graphene dispersion in or with natural resins derived from plants such as rosin, dammar, mastic, copal, amber, balsam and natural rubber, natural resins derived from animals such as shellac, glue, tortoiseshell and casein, thermosetting resins such as phenol resin, epoxy resin, melamine resin, urea resin, unsaturated polyester resin, alkyd resin, polyurethane and thermosetting polyimide, thermoplastic resins such as polyethylene, high density polyethylene, medium-density polyethylene, low-density polyethylene, polypropylene, polyvinyl chloride, polyvinylidene chloride, polystyrene, polyvinyl acetate, polytetrafluoroethylene, ABS resin, AS resin and acrylic resin, and plastic materials such as engineering plastics such as polyamide, nylon, polyacetal, polycarbonate, modified polyphenylene ether, polybutylene terephthalate, polyethylene terephthalate, glass fiber-reinforced polyethylene terephthalate, cyclic polyolefin, polyphenylene sulfide, polysulfone, polyether sulfone, amorphous polyarylate, crystalline polymer, polyether ether ketone, thermoplastic polyimide and polyamide-imide, and then, kneading, drying, and molding.

Also, rubbers and rubber composite materials containing the graphenes and having improved electric conductivity, thermal conductivity, heat resistance, strength, and flexibility can be obtained by dispersing or mixing the obtained graphene dispersion in or with synthetic rubbers such as acrylic rubber, nitrile rubber, isoprene rubber, urethane rubber, ethylene propylene rubber, epichlorohydrin rubber, chloroprene rubber, silicone rubber, styrene-butadiene rubber, butadiene rubber, fluorine-containing rubber, and polyisobutylene rubber, and then, kneading, drying, and molding.

Moreover, various composite materials containing the graphenes and having improved electric conductivity, thermal conductivity, heat resistance, strength, fracture toughness, and electromagnetic wave shielding property can be obtained by dispersing or mixing the obtained graphene dispersion in or with ceramic materials such as oxides such as pottery, glass, cement, mortar, gypsum, enamel, alumina and zirconia, hydroxides such as hydroxyapatite, carbides such as silicon carbide and boron carbide, carbonates, nitrides such as silicon nitride, boron nitride, aluminum nitride and GaN, halides such as fluophosphate, phosphate, barium titanate, high temperature superconductive ceramics, ferrite, lead zirconium titanate, steatite, zinc oxide, and GaAs, and then, kneading, drying, molding, baking, and sintering.

Moreover, various materials containing the graphenes and having improved electric conductivity, thermal conductivity, heat resistance, magnetic properties, strength, elasticity, and fracture toughness can be obtained by dispersing or mixing the obtained graphene dispersion in or with elements such as tungsten, rhenium, osmium, tantalum, molybdenum, niobium, iridium, ruthenium, hafnium, technetium, boron, rhodium, vanadium, chromium, zirconium, platinum, thorium, lutecium, titanium, palladium, protactinium, thulium, scandium, iron, steel, cast iron, yttrium, erbium, cobalt, holmium, nickel, dysprosium, silicon, terbium, curium, gadolinium, beryllium, manganese, americium, promethium, uranium, copper, samarium, gold, actinium, neodymium, berkelium, silver, germanium, praseodymium, lanthanum, californium, calcium, europium, ytterbium, cerium, strontium, barium, radium, aluminum, magnesium, plutonium, neptunium, antimony, tellurium, zinc, lead, cadmium, thalium, bismuth, polonium, tin, lithium, indium, sulfur, sodium, potassium, rubidium, gallium and cesium, and alloys, carbides, oxides, nitrides, and hydroxides of these elements, and then, kneading, drying, molding, extruding, pressing, melting, casting, forging, rolling, granulating, and flame spraying.

(Graphene)

In the present invention, a graphene refers to a single-layer or multi-layer (up to several-layer, for example, about 10-layer) graphene. In the graphene, edges refer to edges of carbon hexagonal planes forming the graphene. If thickness of a graphene is very thin, the edge may be rolled by Van der Waals force of itself, and edges of the graphenes of the present invention also include the edges in such a state.

In the present invention, an amount of hydrogen is measured in accordance with General Rules for Determination of Hydrogen in Metallic Materials (JIS Z 2614: 1990. Determination is carried out by an inert gas heating method which is a condition for "steel". The measurement is concretely conducted by heating a sample up to 2000° C. under argon gas atmosphere and measuring an integrated amount of generated hydrogen by gas chromatograph.).

Further, the open pore ratio (apparent pore ratio) is a ratio of a volume of a (open) cavity into which a liquid or gas can invade to a volume obtained from an outer shape of a material. Generally, a material having a high open pore ratio has continuous pores and has air permeability. In this specification, the open pore ratio is obtained from the following equation.

Open pore ratio (%)={(Apparent specific gravity−Bulk specific gravity)/Apparent specific gravity}×100

Apparent specific gravity: A value measured using a sample before pulverization by a helium gas substitution pycnometer method with a densimeter AccuPyc 1330-PCW available from Shimadzu Corporation. Bulk specific gravity: A value obtained by dividing a sample weight by a volume calculated from outer dimensions of the sample.

Further, the total pore ratio is a ratio of a volume of a total cavity (including closed pores in addition to open pores) to a volume calculated from an outer shape of a sample. In this specification, the total pore ratio is obtained from the following equation.

Total pore ratio (%)={(True specific gravity−Bulk specific gravity)/True specific gravity}×100

The true specific gravity is a specific gravity measured using a target material in a state of being pulverized into a fine powder in order to minimize an effect attributable to a cavity contained in the target material, and in this specification, the true specific gravity is measured using a powder sample having passed through a 74 μm filter.

An apparent specific gravity, a bulk specific gravity, and a true specific gravity are synonymous with an apparent density, a bulk density, and a true density, respectively.

In this specification, a spacer and a sleeve are used being placed inside a closed vessel made of graphite and are inserted between inner wall of the vessel and a pre-baked starting material so that the both do not come into direct contact with each other. The spacer is one covering a pre-baked starting material mainly from the top and bottom thereof, and the sleeve is one covering a pre-baked starting material from the side thereof. There can be a case where distinction between the spacer and the sleeve is meaningless depending on a shape of vessel.

A mean fiber diameter is a value measured with scanning electron microscope (SEM), and is a mean value of randomly selected 30 fibers. A mean fiber length is a value measured in the same manner.

In this specification, a numerical range shown, for example, by from 1200 to 1900 means a range of 1200 or more and 1900 or less unless it is inconsistent with the rest of the specification.

EXAMPLES

The present invention is then described by means of Examples, but is not limited to these Examples.

Example 1

(Pre-Baking)

Yarns of phenol resin having a mean fiber diameter of 20 μm were woven in plain weave, and a fabric having a weight per unit area of 200 g/m² and a thickness of 600 μm was made and cut into 50 mm wide and 300 mm long. After that, each of the fabrics was pre-baked at the maximum ultimate temperatures of 500° C., 600° C., 700° C., 900° C., 1000° C., or 1200° C. under an inert gas atmosphere. Amounts of hydrogen remaining in the starting materials after the pre-baking were analyzed in accordance with General Rules for Determination of Hydrogen in Metallic Materials (JIS Z 2614: 1990). The results are shown in Table 1.

(HIP Treatment)

The pre-baked starting material fabric which was pre-baked at each temperature was charged in a screw-capped (triangular screw) graphite crucible made of a graphite having a bulk density of 1.80 and an open pore ratio of 10%, and a threaded top cover was turned to be closed, and thus the crucible containing the pre-baked starting material was closed. After charging the graphite crucible in hot isostatic pressing equipment, a temperature and pressure inside the equipment were increased to 600° C. and 70 MPa, respectively in one hour using argon gas, and thereafter, heating at a temperature elevating rate of 500° C. per hour and pressurizing were continued to reach a maximum ultimate pressure of 190 MPa and a maximum ultimate temperature of 1500° C. Then, the maximum ultimate temperature and pressure were maintained for one hour, the temperature was reduced to room temperature and the pressure was decreased, and the target products of Sample Nos. 1-(1) to 1-(6) were obtained. A period of time required from charging of the graphite crucible up to taking out thereof was 5 to 8 hours.

(Results)

Figure 8:
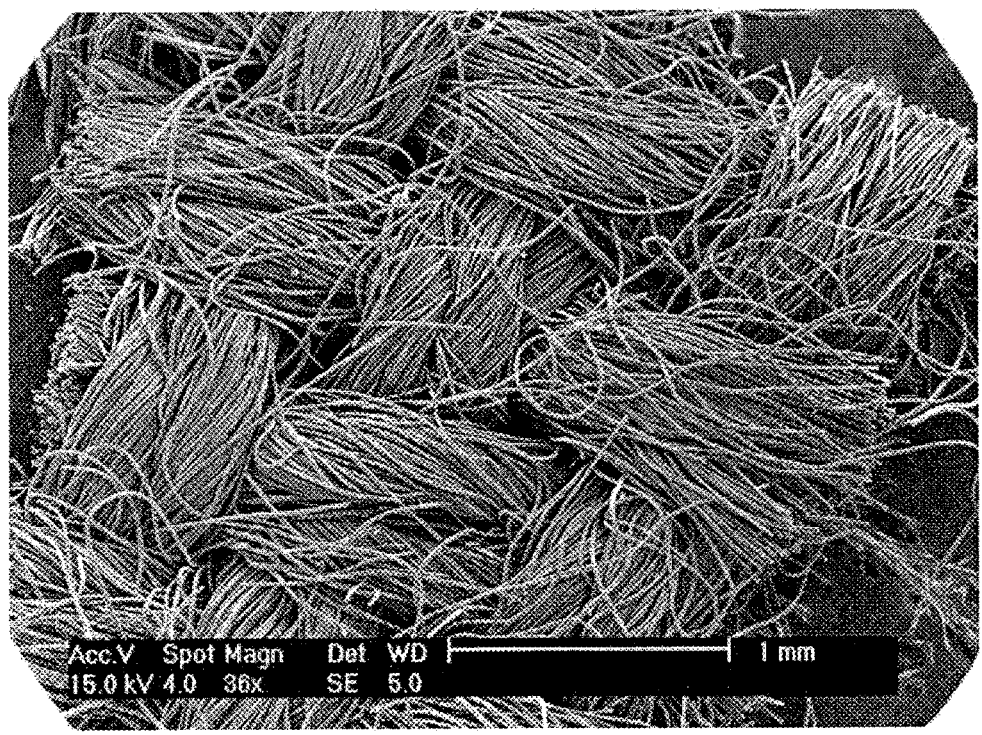
FIG. 8 A photograph by a scanning electron microscope (SEM) of the target product of Sample No. 1-(1).
Figure 9:
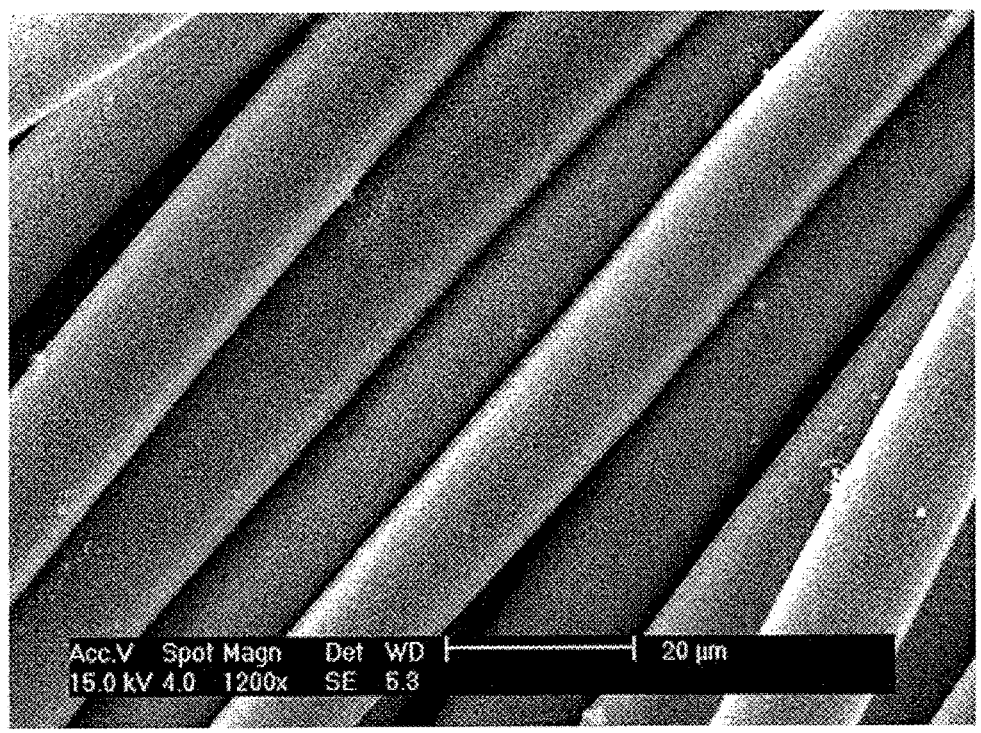
FIG. 9 An enlarged view of the foregoing figure.
Figure 10:
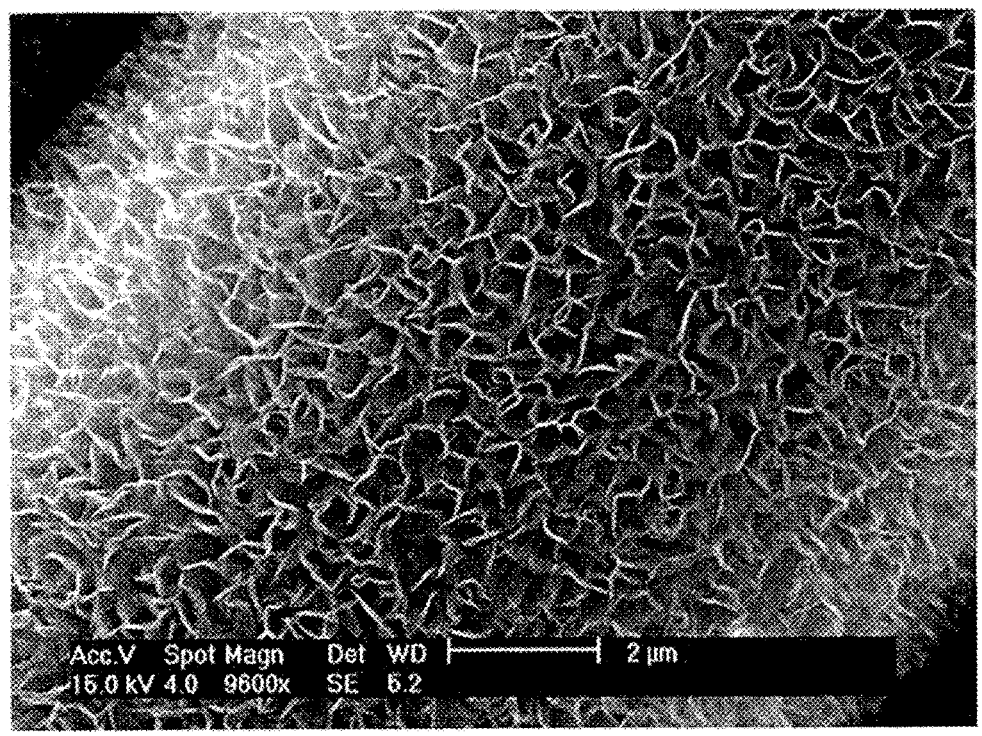
FIG. 10 An enlarged view of the foregoing figure.
Figure 11:
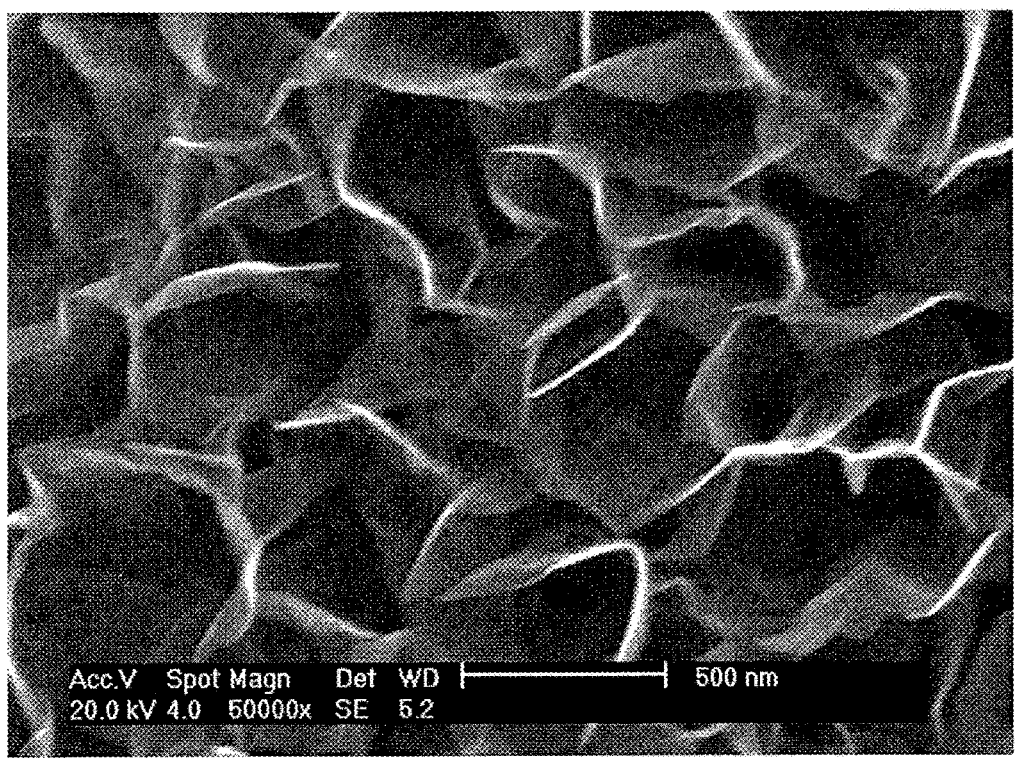
FIG. 11 An enlarged view of the foregoing figure.
Figure 12:
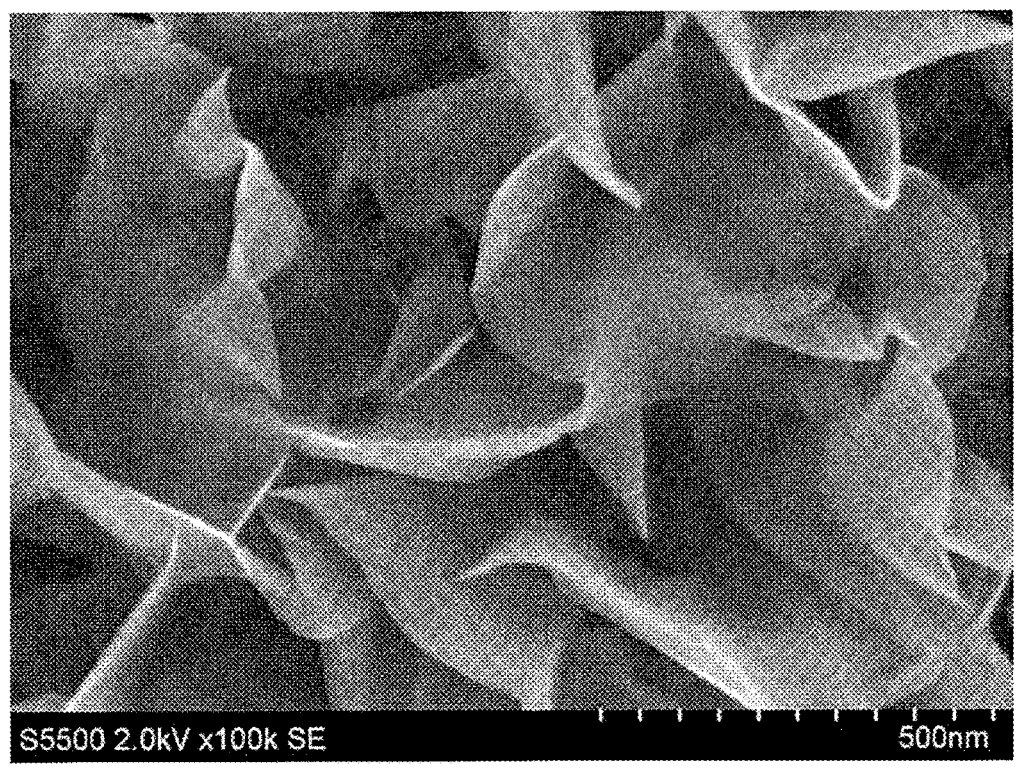
FIG. 12 An enlarged view of the foregoing figure.
Figure 13:
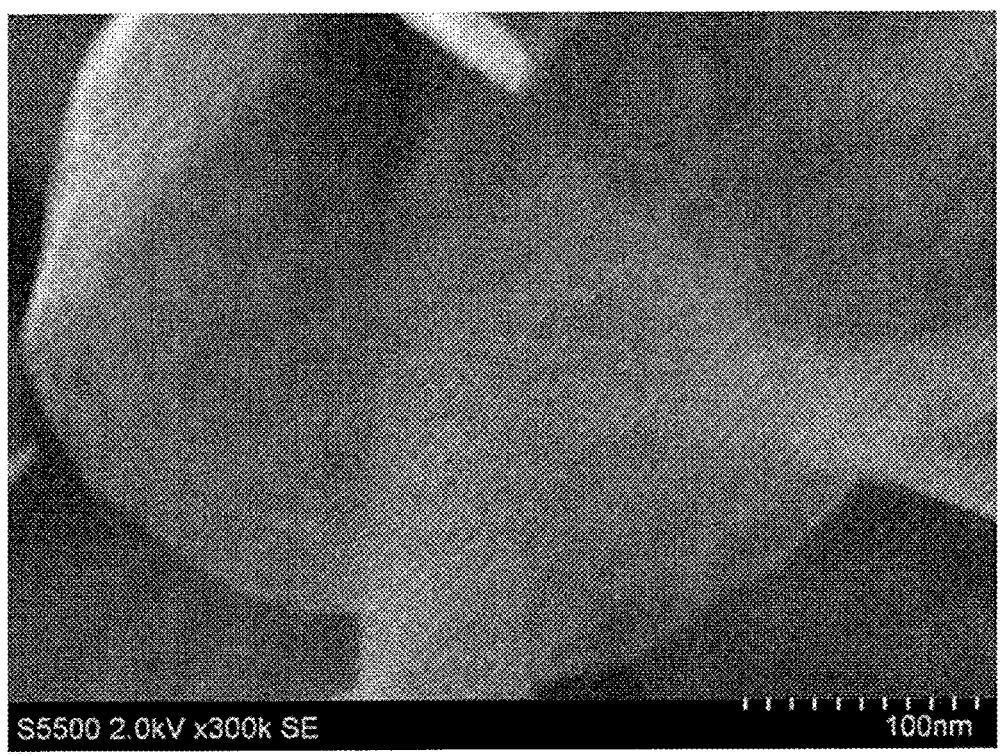
FIG. 13 An enlarged view of the foregoing figure.

The surfaces of the resultant carbon fibers were observed with a scanning electron microscope (SEM) and a transmission electron microscope to examine appearances of generated graphenes. The results are shown in Table 1. As shown in Table 1, in the case where the pre-baking temperature was 500° C. and the remaining hydrogen was 18500 ppm, generation of graphene was most remarkable. As the pre-baking temperature increased, generation of graphene was smaller. In the case where the pre-baking temperature was 1200° C. and the remaining hydrogen was 220 ppm, graphene was hardly generated. FIG. 8 is a photograph by SEM showing a surface of Sample No. 1-(1). It is seen that the sample was converted to a woven fabric of carbon fiber while maintaining the form of a woven fabric of phenol resin fiber. FIG. 9 is an enlarged SEM photograph of fibers in the woven fabric of FIG. 8. FIG. 10 is an further enlarged SEM photograph of the surface of the fibers. It is observed that graphenes grow thick uniformly on the surface of the carbon fiber constituting the woven fabric, and the outermost surface of the carbon fiber is composed of edges of graphenes. FIG. 11 is an enlarged SEM photograph of graphenes in FIG. 10 showing that each graphene is grown radially from the surface of the fiber independently without contacting with one another. FIG. 12 is an enlarged photograph of FIG. 11 using a high-resolution electron micrograph. FIG. 13 is a photograph with a high-resolution electron micrograph wherein graphenes shown in FIG. 12 are further enlarged at 300,000-fold magnification. FIG. 12 shows thin tips of a graphene rolled as a cigar and looking like a needle, whereby it is seen that the graphene has a large Van der Waals force. In FIG. 13, electron beams of an accelerating voltage of 2 kv penetrate through the graphene, whereby it is seen that the graphene is very thin.

Figure 14:
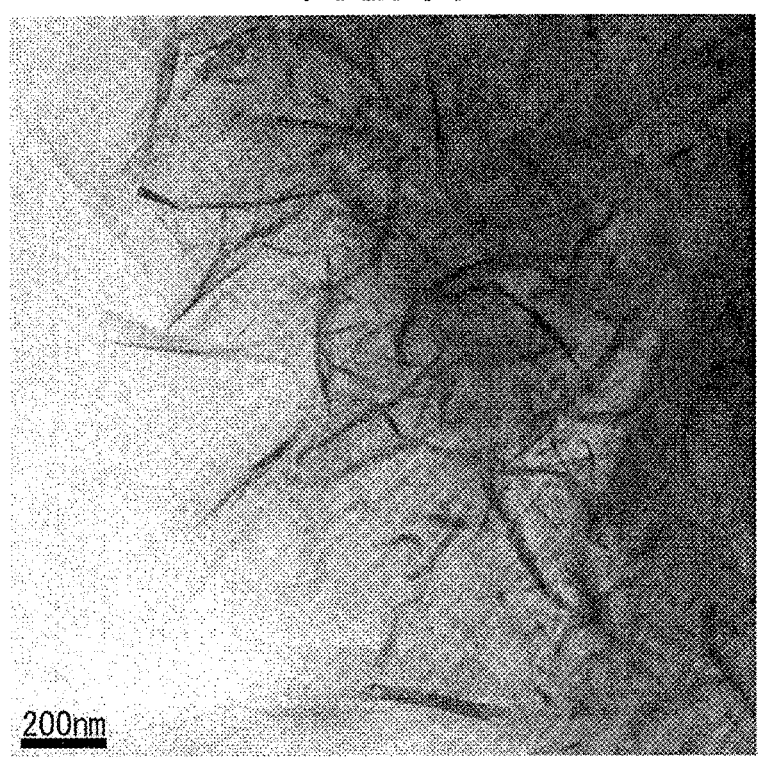
FIG. 14 A photograph by a transmission electron microscope (TEM) of a sample of graphenes separated from Sample No. 1-(1).
Figure 15:
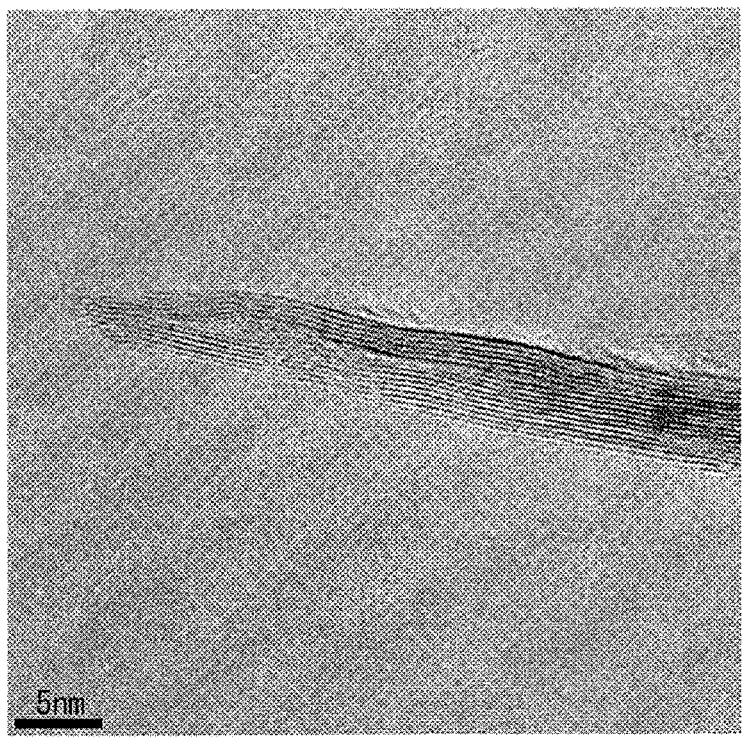
FIG. 15 An enlarged view of the foregoing figure.

To observe graphenes of Sample 1-(1) with a transmission electron microscope (TEM), the sample was soaked in an isopropyl alcohol and subjected to ultrasonic wave treatment at the frequency of 24 kHz for 20 minutes to detach the graphenes from the carbon fibers. The resultant graphene dispersion was dropped into a microgrid for TEM observation to prepare a sample for observation. FIG. 14 is a TEM photograph of graphenes at a low magnification showing thin graphenes and the tips being rolled like a cigar, which look like a thick needle. FIG. 15 is a TEM photograph wherein the cigar-like tip of the graphene is enlarged. The lattice image of the tip of the graphene in FIG. 15 shows that the number of graphene layers is 6 and the thickness is about 2 nm.

TABLE 1

| | Pre-baking | | Hot isostatic pressing treatment | | |
| --- | --- | --- | --- | --- | --- |
| Sample No. | Pre-baking temp. (° C.) | Amount of remaining hydrogen (ppm) | Maximum ultimate temp. (° C.) | Maximum ultimate pressure (MPa) | Appearance of generated graphene |
| 1-(1) | 500 | 18500 | 1500 | 190 | Remarkably generated. |
| 1-(2) | 600 | 10100 | 1500 | 190 | Remarkably generated. |
| 1-(3) | 700 | 5500 | 1500 | 190 | Generated. |
| 1-(4) | 900 | 1000 | 1500 | 190 | Generated. |
| 1-(5) | 1000 | 500 | 1500 | 190 | Slightly generated. |
| 1-(6) | 1200 | 220 | 1500 | 190 | Not generated. |

Example 2

After a woven fabric obtained in the same manner as in Example 1 was cut into 50 mm wide and 300 mm long, each of the fabrics was pre-baked at the maximum ultimate temperature of 600° C. under an inert gas atmosphere. The pre-baked starting material fabrics were subjected to HIP treatment in the same manner as in Example 1 except that the maximum ultimate temperature was changed to 1200° C. or 1300° C. and the maximum ultimate pressure was changed to 90 MPa in the HIP treatment to obtain target products of Sample Nos. 2-(1) and 2-(2).

(Results)

Figure 16:
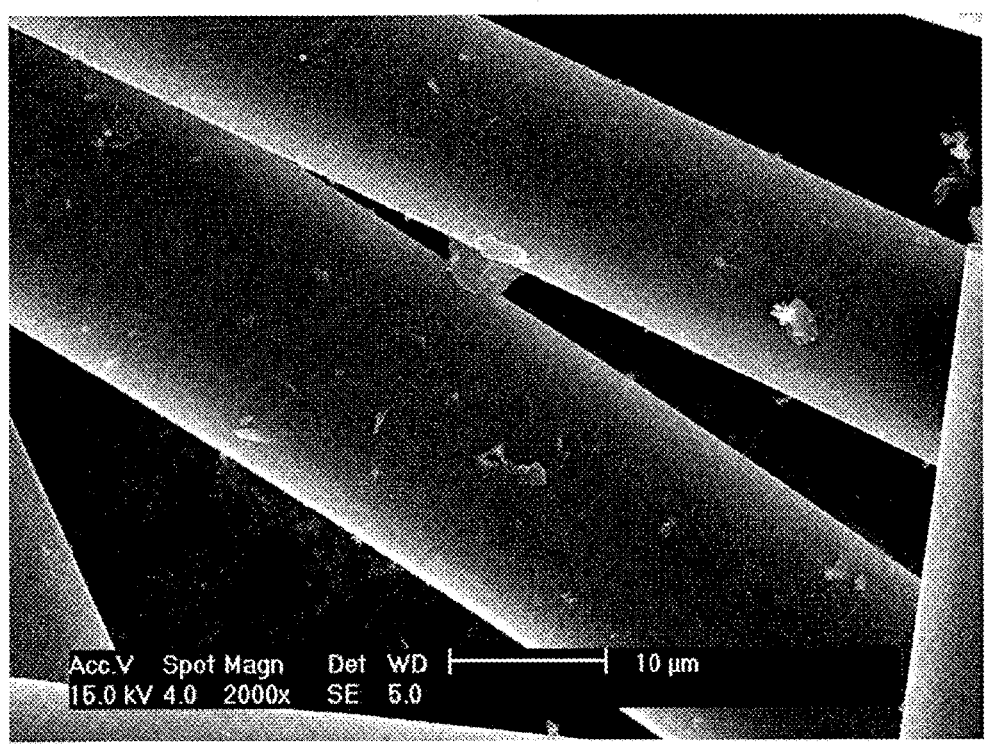
FIG. 16 A photograph by SEM of Sample No. 2-(1).
Figure 17:
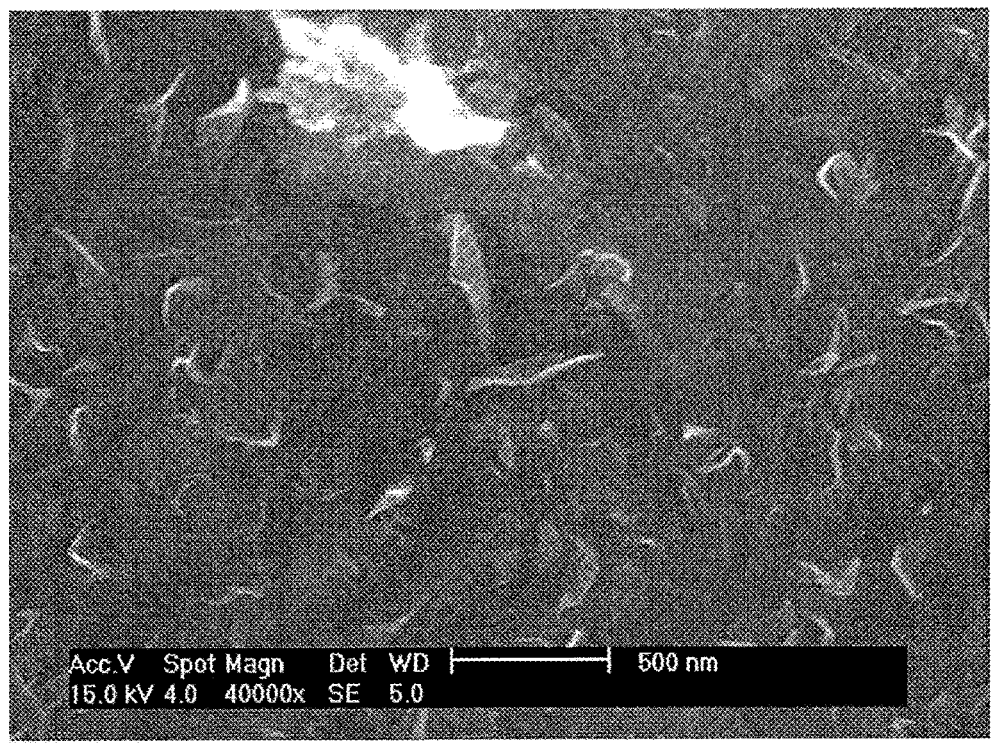
FIG. 17 An enlarged view of the foregoing figure.
Figure 18:
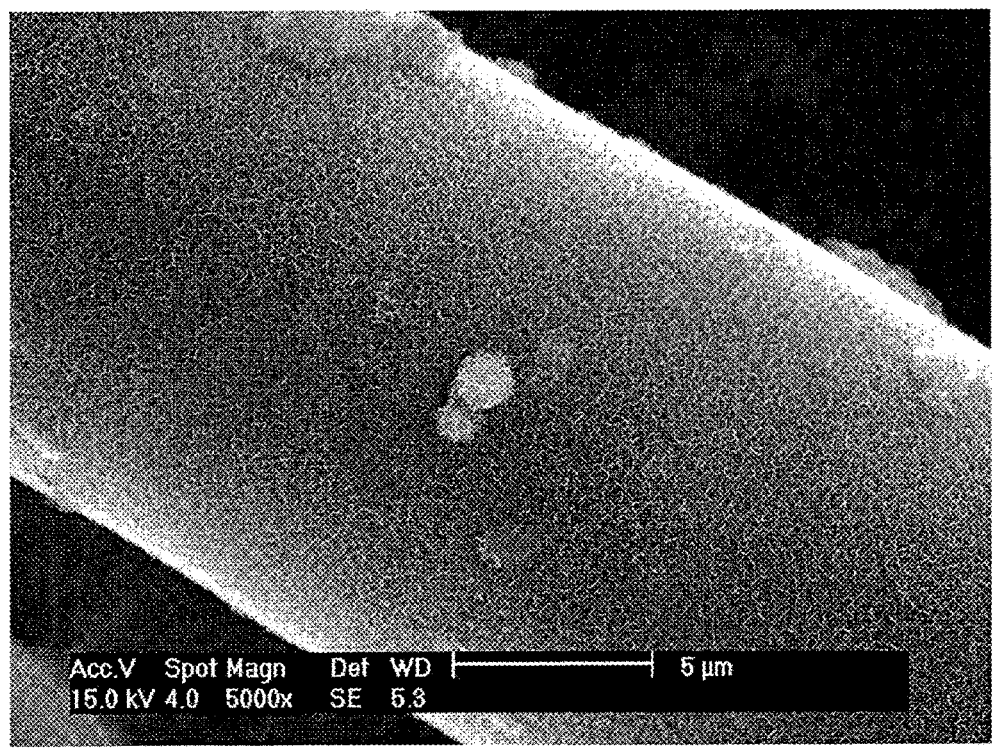
FIG. 18 A photograph by SEM of Sample No. 2-(2).
Figure 19:
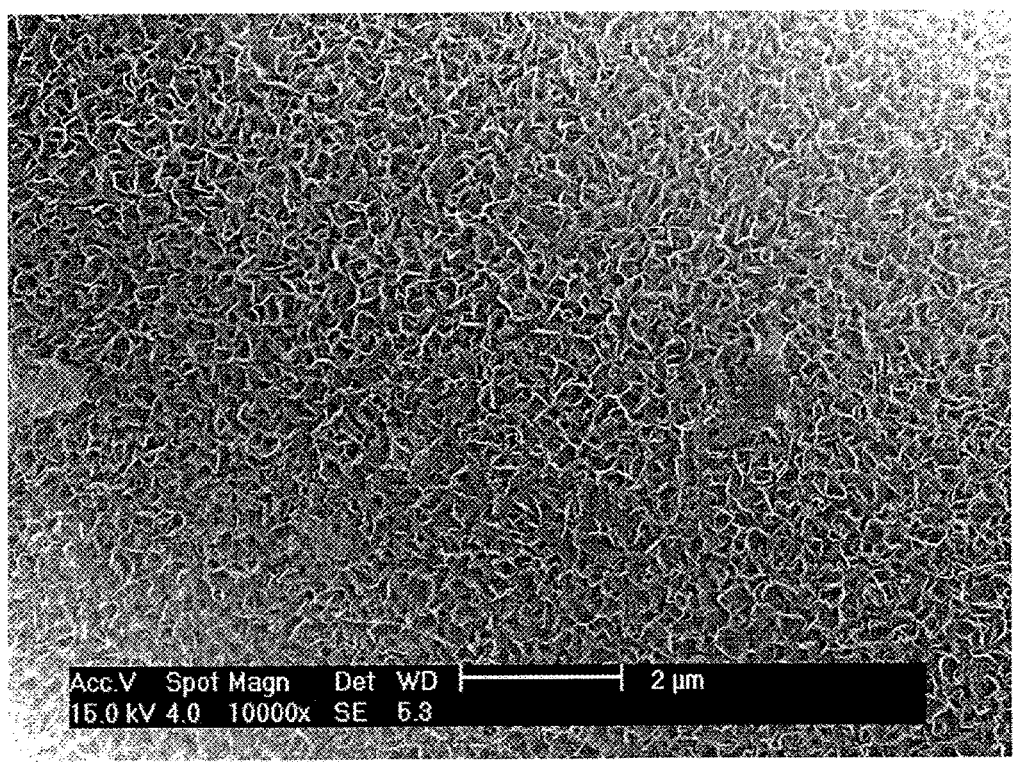
FIG. 19 An enlarged view of the foregoing figure.

The surfaces of fibers of the target products were observed with SEM to examine appearances of generated graphenes. As a result of SEM observation, for the sample treated at the maximum ultimate temperature of 1200° C. (Sample No. 2-(1)), minute graphenes were generated; and for the sample treated at the maximum ultimate temperature of 1300° C. (Sample No. 2-(2)), minute graphenes grew thickly. FIGS. 16 and 17 are SEM photographs showing the surfaces of the fibers of Sample No. 2-(1), and the size of the graphenes was less than 500 nm. FIGS. 18 and 19 are SEM photographs showing the surfaces of the fibers of Sample No. 2-(2), and the size of the graphenes was less than 1000 nm.

TABLE 2

| | Pre-baking | | Hot isostatic pressing treatment | | |
| --- | --- | --- | --- | --- | --- |
| Sample No. | Pre-baking temp. (° C.) | Amount of remaining hydrogen (ppm) | Maximum ultimate temp. (° C.) | Maximum ultimate pressure (MPa) | Appearance of generated graphene |
| 2-(1) | 600 | 10100 | 1200 | 190 | Minute graphenes were generated. |
| 2-(2) | 600 | 10100 | 1300 | 190 | Minute graphenes were generated remarkably. |

Example 3

After a woven fabric prepared in the same manner as in Example 1 was cut into 50 mm wide and 300 mm long, each of the fabrics was pre-baked at the maximum ultimate temperature of 600° C. under an inert gas atmosphere. The pre-baked starting material fabrics were subjected to HIP treatment in the same manner as in Example 1 except that the maximum ultimate temperature was changed to 1400° C. to obtain a target product of Sample No. 3-(1).

(Results)

Figure 20:
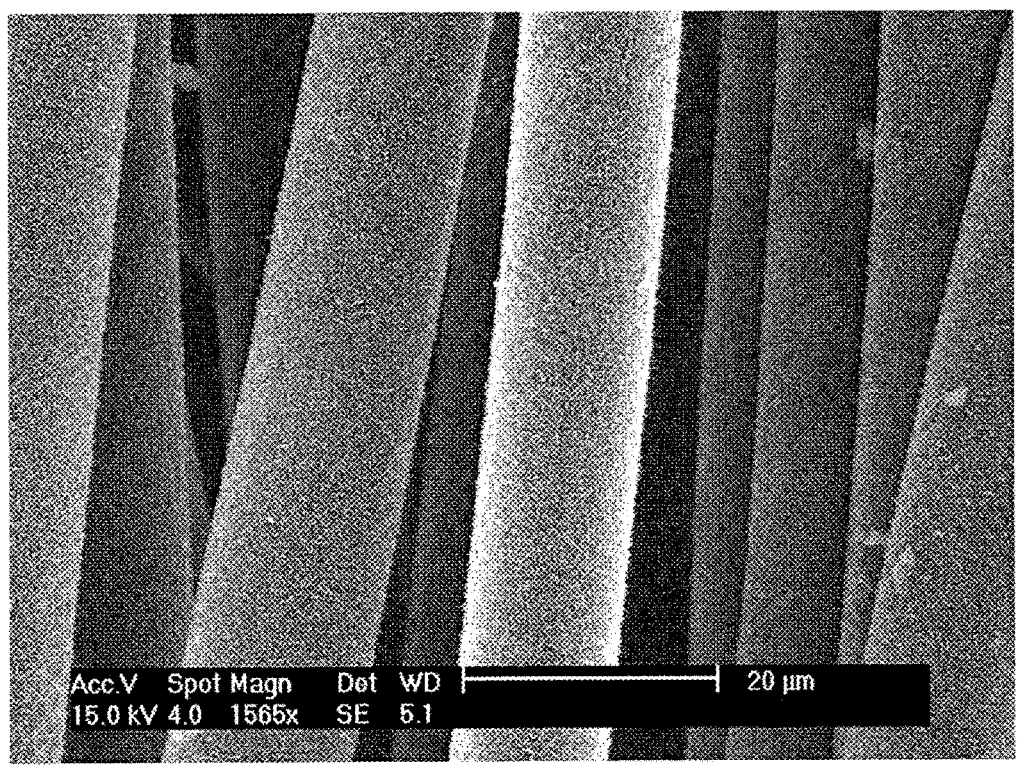
FIG. 20 A photograph by SEM of Sample No. 3-(1).
Figure 21:
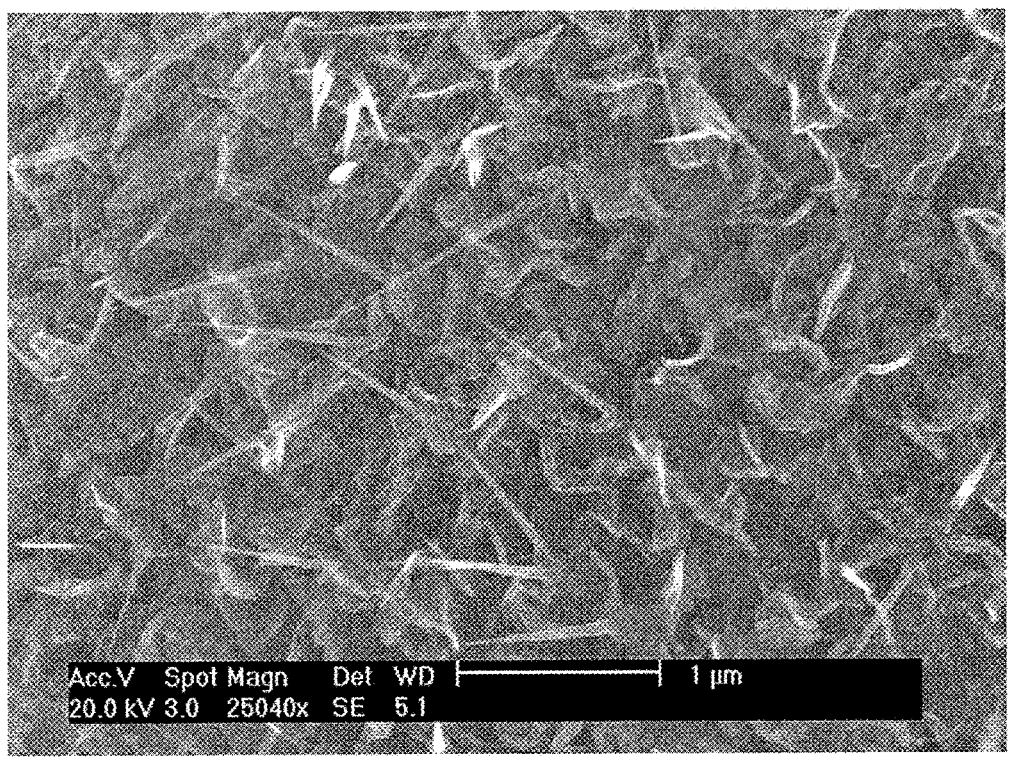
FIG. 21 An enlarged view of the foregoing figure.

The surfaces of the fibers of the target product were observed with a scanning electron microscope (SEM) to examine appearances of generated graphenes. FIGS. 20 and 21 are SEM photographs showing the surfaces of the fibers. Graphenes grew thickly like Sample No. 1-(1) in Example 1. When compared to Sample No. 1-(1), however, the tips of the graphenes were rolled like a cigar to give graphene rolls like a twisted paper string having sharp tip like a needle.

TABLE 3

| | Pre-baking Pre-baking temp. (° C.) | Hot isostatic pressing treatment | | |
| --- | --- | --- | --- | --- |
| Sample No. | | Maximum ultimate temp. (° C.) | Maximum ultimate pressure (MPa) | Appearance of generated graphene |
| 3-(1) | 600 | 1400 | 190 | Generated remarkably. |

Example 4

The same treatment as in Example 3 was carried out by using various resin fibers shown in Table 4 (that is, long fiber, short fiber, twisted yarn, plain-woven fabric, satin fabric, twill fabric, non-woven fabric, as well as plain-woven fabric made of blended yarn of one of the resin fibers and a carbon fiber).

(Results)

In all examples, the carbon fibers of the present invention having an outermost surface composed of edges of graphenes were generated, while maintaining the form of phenol resin being a starting material.

TABLE 4

| Sample No. | Starting material Organic compound | Starting material Form | Mean fiber diameter (μm) | Mean fiber length (mm) | Appearance of generated graphene |
|---|---|---|---|---|---|
| 4-(1) | Phenol resin | Long fiber | 18 | 100 | Generated. |
| 4-(2) | Phenol resin | Long fiber | 30 | 200 | Generated. |
| 4-(3) | Phenol resin | Short fiber | 18 | 0.2 | Generated. |
| 4-(4) | Phenol resin | Short fiber | 25 | 0.5 | Generated. |
| 4-(5) | Phenol resin | Short fiber | 35 | 0.4 | Generated. |
| 4-(6) | Phenol resin | Twisted yarn (Number of twists: 100) | 14 | 1000 | Generated. |
| 4-(7) | Phenol resin | Plain-woven fabric (Width: 100 mm, Length: 300 mm) (Weight per unit area: 220 g/m$^2$) | 35 | | Generated. |
| 4-(8) | Phenol resin | Satin fabric (Width: 100 mm, Length: 300 mm) (Weight per unit area: 290 g/m$^2$) | 14 | | Generated. |
| 4-(9) | Phenol resin | Twill fabric (Width: 100 mm, Length: 300 mm) (Weight per unit area: 300 g/m$^2$) | 14 | | Generated. |
| 4-(10) | Phenol resin | Non-woven fabric (Width: 100 mm, Length: 200 mm) (Weight per unit area: 120 g/m$^2$) | 20 | | Generated. |
| 4-(11) | Acrylic resin | Twisted yarn (Number of twists: 200) (Infusibilized product) | 30 | 1500 | Generated. |
| 4-(12) | Phenol resin | Plain-woven fabric made of blended yarn of carbon fiber and phenol resin fiber (Weight per unit area: 230 g/m$^2$) | 20 | | Generated. |

"Infusibilization" in the starting material of Sample No. 4-(11) refers to a process in which a polyacrylonitrile resin is heated at a temperature of 200 to 300° C. in the atmosphere beforehand to introduce oxygen groups and the like into the chemical structure of the polyacrylonitrile resin so that the resin may not be melted at the step of pre-baking.

Example 5

(Preparation of Graphene Dispersion)

Five grams of carbon fibers of the present invention obtained from Sample No. 4-(3) in Example 1 were soaked in a liter of 2-propanol solution. Next, the solvent containing the carbon fibers was subjected to ultrasonic wave treatment at the frequency of 24 kHz for 2 hours to separate and disperse graphenes in the solvent. Then, the solution was filtered by using a stainless-steel mesh with sieve openings of 25 μm to leave carbon fibers, from which graphenes were separated, on the mesh. As a result, a graphene dispersion (1) was obtained as a filtrate. It took about 3 minutes to filter by using the stainless-steel mesh.

The carbon fibers of the present invention obtained from Sample No. 4-(7) in Example 1 were subjected to the same treatment as described above except that a stainless-steel mesh with sieve openings of 102 μm was used, and a graphene dispersion (2) was obtained as a filtrate. It took about 3 minutes to filter by using the stainless-steel mesh.

(Quantitative Determination of Graphenes)

To perform quantitative analysis of graphenes dispersed in the graphene dispersions (1) and (2), 100 ml each of the dispersions was put in an aluminum cup, and then the cup was put on an electric hot plate set to 70° C. to evaporate the solvent over 24 hours. The amount of graphenes dispersed in the solvent was determined by weighing the aluminum cup before the quantitative analysis and after the evaporation of the solvent with a precise electric balance. Graphene residues in the aluminum cup after the evaporation of the solvent were observed with a field emission electron microscope (FE-SEM) to evaluate the purity of the graphenes. The results are shown in Table 5.

TABLE 5

| | Carbon fiber used for preparation of dispersion | | | Graphene | |
|---|---|---|---|---|---|
| | Sample No. | Form | Aspect ratio | Amount of dispersed graphenes (mg/ml) | Purity |
| Graphene dispersion (1) | 4-(3) | Short fiber | 11.1 | 0.21 | Good. |
| Graphene dispersion (2) | 4-(7) | Plain-woven fabric | 100 or more | 0.15 | Good. |

Figure 22:
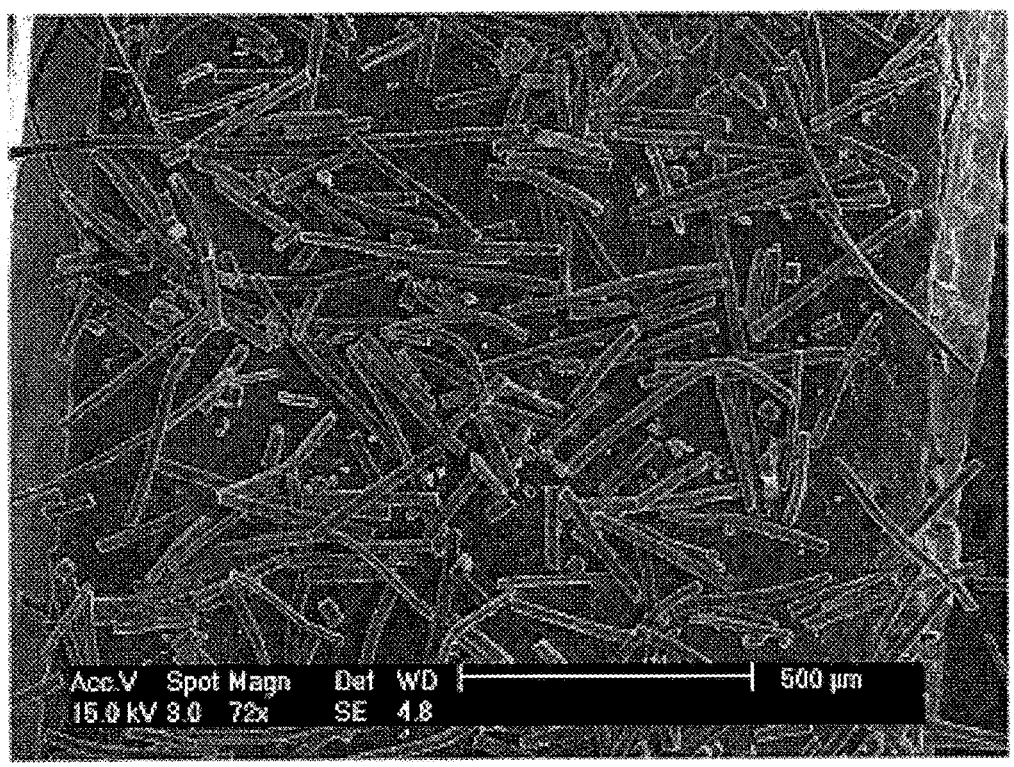
FIG. 22 A photograph by FE-SEM of carbon fibers remaining on a stainless-steel mesh with sieve openings of 25 μm in the preparation step of graphene dispersion (1) in Example 5.
Figure 23:
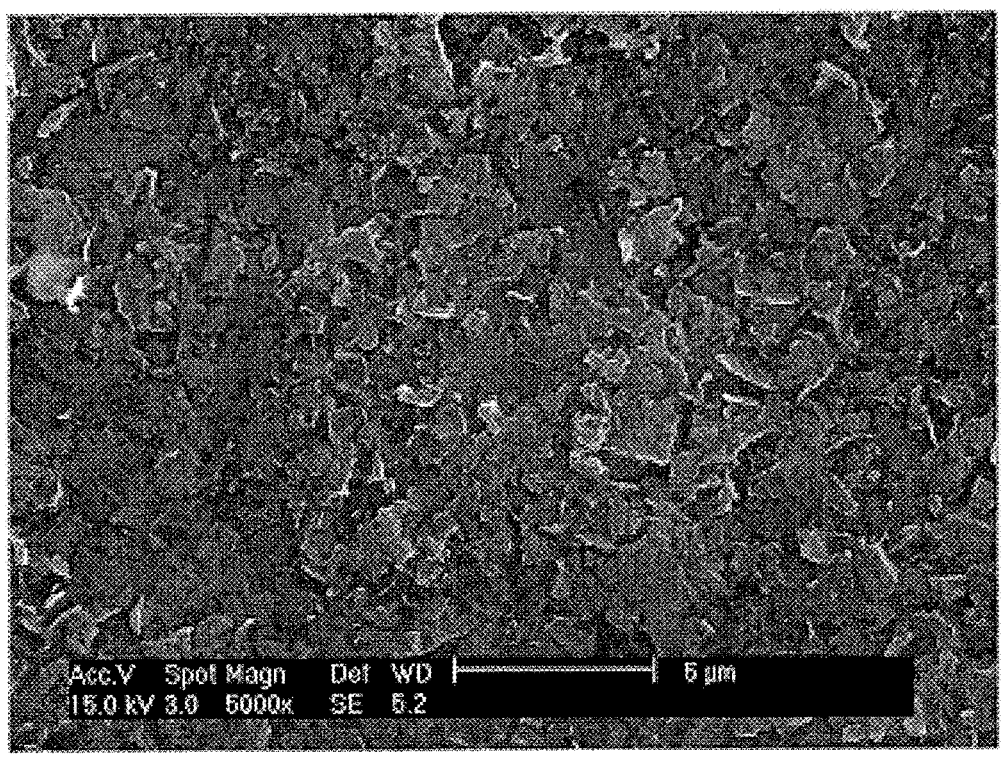
FIG. 23 A photograph by FE-SEM of graphene residues after evaporation of the solvent in graphene dispersion (1) in Example 5.
Figure 24:
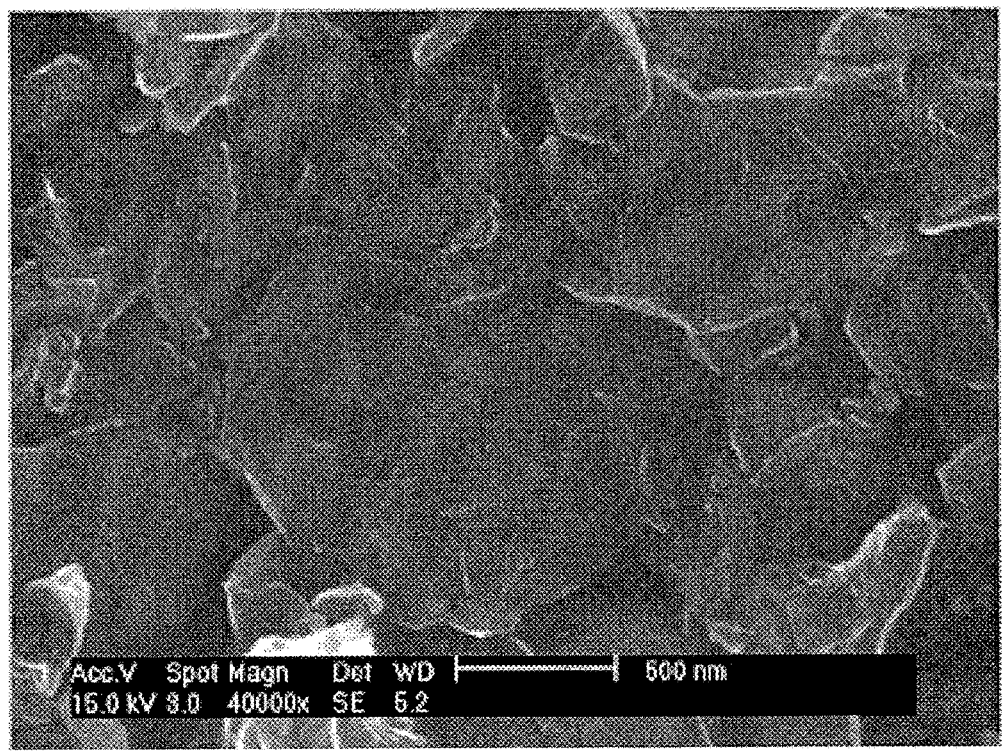
FIG. 24 An enlarged view of the foregoing figure.

FIG. 22 is an FE-SEM photograph showing carbon fibers remaining on the stainless-steel mesh with sieve openings of 25 μm in the preparation step of the graphene dispersion (1). The figure shows that the carbon fibers from which graphenes were separated remain on the mesh by effective filtration. FIG. 23 is an FE-SEM photograph showing graphene residues after the evaporation of the solvent in the graphene dispersion (1). FIG. 24 is an enlarged view of the above figure. Whereas the carbon fibers from which graphenes were separated or by-products such as amorphous carbon were not observed, only graphenes after evaporation to dryness were observed. Thus, it was confirmed the purity of the graphenes was good.

Example 6

(Preparation of the Carbon Fibers of the Present Invention)

In addition to the carbon fiber of the present invention obtained as Sample No. 4-(3) in Example 1, carbon fibers (Sample Nos. 6-(1) to 6-(3)) were produced in the same manner as in Sample No. 4-(3) in Example 1 except that the lengths of the short fibers of the phenol resin being a starting material were changed so that the aspect ratio is 5.6, 2.8, and 1.7, respectively.

(Preparation of Graphene Dispersion)

Graphene dispersions (3) to (5) were prepared in the same manner as in Example 5 by using the obtained carbon fibers.

(Quantitative Determination of Graphenes)

Quantitative analysis was performed for graphenes dispersed in the graphene dispersions in the same manner as in Example 5. The results are showed in Table 6. The result in the case of the graphene dispersion (1) is also shown.

TABLE 6

| | Carbon fiber used for preparation of dispersion | | | | Graphene | |
|---|---|---|---|---|---|---|
| | Starting material Organic compound | Sample No. | Mean fiber diameter (μm) | Mean fiber length (μm) | Aspect ratio | Amount of dispersed graphenes (mg/ml) | Purity |
| Graphene dispersion (1) | Phenol resin | 4-(3) | 18 | 200 | 11.1 | 0.21 | Good. |
| Graphene dispersion (3) | Phenol resin | 6-(1) | 18 | 100 | 5.6 | 0.18 | Good. |
| Graphene dispersion (4) | Phenol resin | 6-(2) | 18 | 50 | 2.8 | 0.15 | Good. |
| Graphene dispersion (5) | Phenol resin | 6-(3) | 18 | 30 | 1.7 | 0.005 | — |

In Table 6, when the resin fibers with the aspect ratio of 2.8 or more are used, the amount of dispersed graphenes is large in the graphene dispersion and the purity of graphene is good. Meanwhile, when the aspect ratio is 1.7, the carbon material (Sample No. 6-(3)) used for preparation of the dispersion could not be soaked sufficiently in 2-propanol being the solvent. It can be considered that this is because if aspect ratio is small, carbon material is produced with many closed pores therein, which results in leaving the carbon material afloat around surface of the solvent. Even if it is tried to prepare a graphene dispersion from such carbon material, a sufficient effect of ultrasonic wave treatment cannot be obtained without pulverization process of the material. In the case of the graphene dispersion (5) obtained without pulverization process, the amount of dispersed graphenes is 0.005 mg/ml, which is very small. Therefore, it is desirable that the aspect ratio of an organic compound used as a starting material is about 2.5 or more.

INDUSTRIAL APPLICABILITY

Carbon fibers obtained by the production method of the present invention can be suitably used for transparent conductive materials for forming transparent flexible conductive films; high heat-release and heat-transfer materials for forming heat-release sheets for, for example, smartphone; conductive inks for printable electronics; conductive materials and semiconductor materials for forming semiconductor inks; conductive additive materials for adding to electrodes for lithium-ion batteries, lithium-ion capacitors, fuel cell batteries, other primary and secondary batteries, and the like; gas diffusion layers of fuel cell batteries; catalyst materials used for, for example, reduction of active oxygen; electrodes for, for example, field emission displays and X-ray tubes; needles of tunneling microscopes, and the like.

REFERENCE SIGNS LIST

1 Cover of crucible
1a Outer periphery of cover of crucible
2 Crucible body
2a Inner wall of top of crucible body
3 Pre-baked starting material
4 Spacer
5 Sleeve
6 Carbon fiber
7 Outermost surface

The invention claimed is:

1. A carbon fiber in the form of yarn, woven fabric, or non-woven fabric having an outermost surface composed of edges of graphenes,
   wherein the carbon fiber has edges of graphenes at the outermost surface and has three dimensional network structure of graphene inside the fiber,
   wherein the graphenes at the outermost surface have an angle greater than 0° and less than 180° in relation to the fiber axis of the carbon fiber,
   wherein an aspect ratio of the carbon fiber is 2.5 or more, and
   wherein the outermost surface of the carbon fiber is a surface being in parallel with the fiber axis of the carbon fiber and being recognized as the outermost part of the fiber.

2. A method for producing a graphene dispersion comprising graphenes and a solvent, comprising:
   soaking the carbon fiber of claim 1 in the solvent; and
   subjecting mixture to ultrasonic wave treatment, and then filtering the mixture.

3. The method for producing a graphene dispersion of claim 2, wherein a mean diameter of the carbon fiber is within a range from 0.1 to 500 μm.

4. The method for producing a graphene dispersion of claim 2, wherein the solvent further comprises a dispersant.

5. A carbon fiber of claim 1, wherein a mean diameter of the carbon fiber is within a range from 14 to 500 μm.

6. The method for producing a graphene dispersion of claim 2, wherein a mean diameter of the carbon fiber is within a range from 14 to 500 μm.

* * * * *